United States Patent
Clemmensen et al.

(10) Patent No.: US 8,335,926 B2
(45) Date of Patent: Dec. 18, 2012

(54) COMPUTER SYSTEM AND BIOMETRIC AUTHENTICATION APPARATUS FOR USE IN A COMPUTER SYSTEM

(75) Inventors: Uffe Clemmensen, Roskilde (DK); Søren H. Jensen, Vodskov (DK); Leif Serup, Svenstrup (DK)

(73) Assignee: Quard Technology APS, Roskilde (DK)

( * ) Notice: Subject to any disclaimer, the term of this patent is extended or adjusted under 35 U.S.C. 154(b) by 969 days.

(21) Appl. No.: 10/548,970

(22) PCT Filed: Mar. 15, 2004

(86) PCT No.: PCT/DK2004/000171
§ 371 (c)(1),
(2), (4) Date: Jul. 19, 2006

(87) PCT Pub. No.: WO2004/081766
PCT Pub. Date: Sep. 23, 2004

(65) Prior Publication Data
US 2007/0186116 A1   Aug. 9, 2007

(30) Foreign Application Priority Data
Mar. 13, 2003   (DK) .................... 2003 00384

(51) Int. Cl.
*G06F 21/00* (2006.01)
(52) U.S. Cl. ........ 713/186; 713/182; 713/185; 713/184; 726/2; 726/4; 726/6; 726/9; 726/17; 726/20; 726/21; 707/783; 707/784; 707/785; 711/163; 380/37; 380/42
(58) Field of Classification Search .................. 713/155, 713/186
See application file for complete search history.

(56) References Cited

U.S. PATENT DOCUMENTS

| 4,614,861 | A |   | 9/1986 | Pavlov et al. |
| 4,885,778 | A |   | 12/1989 | Weiss |
| 5,036,461 | A | * | 7/1991 | Elliott et al. .................... 705/44 |

(Continued)

OTHER PUBLICATIONS

Ishida S. et al., Development of Personal Authentication Techniques Using Fingerprint Matching Embedded in Smart Cards, Development of Personal Authentication Techniques Using Fingerprint Matching Embedded in Smart Cards, Jul. 2001, pp. 818-818, vol. E84-D, No. 7, Publisher: IEICE Transactions on Information and Systems, Institute of Electronics Information and Comm., Published in: Tokyo, Japan.

*Primary Examiner* — Nathan Flynn
*Assistant Examiner* — Bryan Wright
(74) *Attorney, Agent, or Firm* — Klein, O'Neill & Singh, LLP

(57) ABSTRACT

A computer system for identifying an individual using a biometric characteristic of the individual includes a biometric sensor for generating a first code, and a controller including a memory for storing the first code and a dynamic binary code conversion algorithm. When the controller receives a sensor code from the biometric sensor, it compares the sensor code with the first code stored in the memory, and if the identity between the sensor code and the first code is verified, the controller generates a first binary code by means of the dynamic binary code conversion algorithm and outputs the first binary code from which the computer system generates a second binary code by means of the dynamic binary code conversion algorithm. The computer system then verifies the identity of the individual if the second binary code matches the first binary code.

5 Claims, 5 Drawing Sheets

U.S. PATENT DOCUMENTS

| | | | |
|---|---|---|---|
| 5,347,580 A * | 9/1994 | Molva et al. | 713/159 |
| 6,163,771 A | 12/2000 | Walker et al. | |
| 2001/0034717 A1 | 10/2001 | Whitworth | |
| 2002/0112183 A1* | 8/2002 | Baird et al. | 713/201 |
| 2002/0138438 A1* | 9/2002 | Bardwell | 705/51 |
| 2002/0141621 A1 | 10/2002 | Lane | |
| 2002/0153424 A1* | 10/2002 | Li | 235/492 |
| 2002/0186838 A1* | 12/2002 | Brandys | 380/30 |
| 2003/0005336 A1 | 1/2003 | Poo et al. | |
| 2004/0035919 A1* | 2/2004 | Horng | 235/375 |
| 2004/0107367 A1 | 6/2004 | Kisters | |
| 2006/0120573 A1* | 6/2006 | Iori | 382/124 |

* cited by examiner

COMPUTER SYSTEM AND BIOMETRIC AUTHENTICATION APPARATUS FOR USE IN A COMPUTER SYSTEM

CROSS-REFERENCE TO RELATED APPLICATION

This application is the national stage entry, under 35 U.S.C. §371, of International Application No. PCT/DK2004/000171; filed Mar. 15, 2004, the disclosure of which is incorporated herein by reference.

FEDERALLY SPONSORED RESEARCH OR DEVELOPMENT

Not applicable.

BACKGOUND

The present invention relates to an apparatus for providing safe identification of an individual using biometric data. The apparatus may be used for secure and anonymous financial transactions and may also function as digital signatures or password for secure IT systems.

High security data cards are known in the art and have been described in publications, such as WO 02/41236, U.S. Pat. No. 6,592,044, while authentication of users using an electronic transaction system has been described in a publication such as U.S. Pat. No. 6,594,759.

Within the technical field of the present invention, systems combining finger print and passwords for accessing or logging into IT systems are known. However, these systems are in some way dependant on external installations for performing its operation. For example storing a finger print on a smart card and inserting the smart card into a smart card reader connected to a computer further connected to a finger print sensor for verifying that the finger print stored on the smart card matches the finger print sensed by the finger print sensor.

Systems wherein the smart card has been replaced by a device such as a USB key or memory unit whereon a statistical code and a finger print is stored are known. By inserting the USB device into a computer further connected to a finger print sensor, a match between the finger print stored on the USB device and finger print registered by the finger print sensor enables the stored code to be displayed in a display included on the USB device.

Both of the above-mentioned examples includes splitting the authentication process into two systems depending on each other in able to function, i.e. the smart card and the USB key are partly dependent on current from the external source and identical finger print recognition algorithms on the devices and the external computers. Disadvantages of these methods are that they are not mobile and accessible as the application is limited to rely on external installations having built-in sensors and that the finger print recognition algorithm or at least the finger print algorithm used while digitising the fingerprints included in the smart card and the USB key is the same as the finger print recognition algorithm included in the external system. Furthermore, the code is stored on the device enabling hackers or thieves to obtain access to the code stored on the device, thereby exposing the user to theft or misuse of the identity of the individual owning the card.

SUMMARY

Devices for identifying individuals using biometric input devices have been described in publications such as WO 2004/010372 and US 2003/0046228. All of the above-mentioned patent publications are hereby incorporated in the present specification by reference in their entirety and for all purposes.

An object of the present invention is to provide a safe and reliable verification of an individual by means of biometric data of said individual and in doing so to any substantial extent eliminating the disadvantages of the prior art techniques and methods.

The above object together with numerous advantages and features and further objects which will be evident from the below detailed description of the present invention are in accordance with a first aspect of the present invention obtained by means of a computer description for identifying a specific individual relative to said system using a biometric characteristic of said specific individual, comprising:

i) at least one apparatus including:
   a housing defining an outer surface,
   a biometric sensor means for generating a first code in response to the detection of said biometric characteristic of said specific individual, said biometric sensor being mounted in said housing and being exposed at said outer surface,
   a controller means mounted in said housing and including a memory for storing said first code and a dynamic binary code conversion algorithm, said controller means being electrically connected to said biometric sensor means,
   a first communication means mounted in said housing and electrically connected to and controlled by said controller means for establishing communication between said apparatus and said computer system,
   a power supply means electrically connected to said biometric sensor means, said controller means, and said first communication means for the supply of electric power thereto, ii) said computer system including a first database containing said dynamic binary code conversion algorithm, and a second communication means for establishing communication between said computer system and said apparatus, iii) said controller means performing, when receiving a code from said biometric sensor means a comparison of said code with said first code stored in said memory and provided said comparison verifies the identity between said code and said first code a generation of a first binary code by means of said dynamic binary code conversion algorithm and outputting said first binary code from said apparatus by means of said first communication means to said computer system, and said computer system generating, when receiving said first binary code from said apparatus by means of said second communication means, a second binary code by means of said dynamic binary code conversion algorithm and verifying the identity of said specific individual provided said second binary code matches said first binary code.

Alternatively, the above object together with numerous advantages and features and further objects which will be evident from the below detailed description of the present invention are in accordance with a second aspect of the present invention is obtained by means of a computer system for identifying a specific individual relative to said system using a biometric characteristic of said specific individual, comprising:

i) at least one apparatus including:
   a housing defining an outer surface,
   a biometric sensor means for generating a first code in response to the detection of said biometric characteristic of said specific individual, said biometric sensor being mounted in said housing and being exposed at said outer surface, a controller means mounted in said housing and including a memory for storing said first code and a dynamic binary code conversion algorithm, said controller means being electrically connected to said biometric sensor means, a display means mounted in said housing and being exposed at said outer surface, said display means being electrically connected to and being controlled by said controller means, a power supply means electrically connected to said biometric sensor means, said controller means, and said display means for the supply of electric power thereto, said computer system including a first database containing said dynamic binary code conversion algorithm, and a code input means, said controller means performing, when receiving a code from said biometric sensor means a comparison of said code with said first code stored in said memory and provided said comparison verifies the identity between said code and said first code a generation of a first binary code by means of said dynamic binary code conversion algorithm and displaying said first binary code converted into an alphanumeric number, preferably a decimal number constituting a Pin code on said display means, and said computer system generating, when receiving said Pin code input by means of said code input means, a second binary code by means of said dynamic binary code conversion algorithm and verifying the identity of said specific individual provided said second binary code matches said first binary code reconverted from said Pin code.

According to the basic teachings of the present invention, it has been realised that a safe and reliable recognition or identification of an individual based on a biometric characteristic of the individual is obtained provided the verification apparatus which may constitute a portable device such as a smart card or any other mobile or stationary apparatus and the computer system relative to which the identity of the individual is to be verified for verifying the authenticity of the individual in question, utilise one and the same dynamic binary code conversion algorithm for generating a code in the apparatus for transmission or input to the computer system and within the computer system for verifying the correct code and in doing so, verifying the identity or authenticity of the individual in question.

In the present context, the expression dynamic binary code conversion algorithm is a term defining any conversion algorithm which in the conversion of an input code into an output code provides a reproducible and unique conversion, which conversion, however, is altered each and every time the algorithm is used, however altered in a predictable manner as the algorithm itself includes the predictable and reproducible determination of the dynamic alteration or change. Below, examples of dynamic binary code conversion algorithms are described, however, the below examples are by no means to be considered complete and therefore, any conversion algorithm fulfilling the above requirements and definition is to be considered in the present context a dynamic binary code conversion algorithm.

In accordance with a first aspect of the present invention, the communication between the apparatus and the computer system may be established in accordance with any hardwire or wireless communication technique well known in the art per se, such a conventional parallel or serial unit and/or in a radio link, an infrared link, a capacitive coupling link, an induction loop link or any other contactless or wireless communication technique.

Similar to the communication means which may be implemented in accordance with any hardwire or wireless communication technique known in the art per se, the code input means may be constituted by any manually operated or automatized code input means such as a keyboard for the input of an alphanumeric number, a voice recognition based code input means allowing the individual to input the alphanumeric number into which the first binary code has been converted by simply spelling the alphanumeric number to a microphone. A video detector for the detection of the digits presented on the display in visible presentation or in e.g. IR displaying may alternatively be used as the code input means.

In accordance with the presently preferred embodiment of the computer system according to a first aspect of the present invention, the apparatus further comprises a display means mounted in said housing and being exposed at said outer surface, said display means being electrically connected to said power supply means and said controller means and being controlled by said controller means, and being powered by said power supply means, said display means displaying said first binary code converted into an alphanumeric number, preferably a decimal number constituting a Pin code after verification of identity between said code and said first code. Equivalently, in accordance with the presently preferred embodiment of the computer system according to the second aspect of the present invention, the apparatus further includes a first communication means mounted in said housing and electrically connected to and controlled by said controller means for establishing communication between said apparatus and said computer system, and said computer system including a second communication means for establishing communication between said computer system and said apparatus.

As will be understood, the above described preferred embodiments of the computer system according to the first and the second aspect of the present invention are literally one and the same.

It is to be understood that the computer system according to the first and the second aspect of the present invention may be implemented for performing additional functions such as the transfer of information for the transfer of amounts from one bank account to another for the allowance of access to a specific area for allowing access to a particular computer database etc.

A particular application of the present invention relates to the unique and reproducible, yet dynamic generation of a verification Pin code or any other alphanumeric number, which number or Pin code is verifiable in the computer system.

The apparatus constituting an essential part of the invention, preferably in a plurality as the computer system serves to verify the identity of more than one individual such as the employees of an organisation or the customers of a bank, a credit organisation etc. may, as mentioned above, be implemented as a stand alone apparatus, preferably implemented as a credit card, having the dimensions of a credit card conforming to the ISO standards (International Organisation of Standardisation).

It is, however, to be understood that apart from a full size credit card conforming to the ISO standard, a double size or a half size or quarter size credit card may further be implemented or according to a specific requirement of the relevant, organisation such as the company issuing the card and running the computer system, the apparatus basically constituting a credit card or any other configurated apparatus may be shaped as a box, a shallow plate having a basically circular, rectangular, square, triangular or any other geometrical configuration.

Alternatively, the apparatus may be implemented as a terminal of a bank organisation, a personal computer connected to a biometric sensor module or any other stationary or portable apparatus. Provided the apparatus is implemented as a credit card, the credit card is advantageously, as will be described below, implemented having a total height of no more 1 mm as the technique verified by the production of the prototype embodiment described below as the presently preferred embodiment verifies the ability of miniaturising the apparatus into a bendable plastics body having the outer dimensions and the thickness of a conventional ISO standard credit card.

In the ISO standard card embodiment of the apparatus according to the present invention, power supply means may be implemented as a battery power supply unit, alternatively a solar cell, a mechanical or piezo cheramic based power generator. The biometric sensor means may be positioned at the same outer surface as the display means, which may be constituted as a plastics foil based multi-digit display or on the opposite side or surface of the credit card embodiment of the apparatus.

It is to be understood that the technique according to the present invention as defined in the above-described first and second aspects of the present invention is by no means based to a single biometric characteristic detection as more than one biometric characteristic may be detected and evaluated. In this contexts, it is to be understood that the term biometric characteristic is to be construed a generic term including and comprising any individual specific characterisitic based on the individuality of the individual such as a characteristic originally created by the unique DNA of the individual. Examples of biometric sensor means are an iris scanner, a blood scanner, a DNA scanner, a voice identification scanner, a face recognition scanner and an array scanner for scanning the palm of the individual or according to the presently preferred embodiment of the computer system according to the first and the second aspect of the present invention implemented as an array scanner for scanning one whole finger or preferably a finger print of the individual.

The utilisation of the dynamic binary code conversion algorithm necessitates that the apparatus and the computer system are synchronised in the verification, else, the first binary code generated by the apparatus and transmitted or input by means of a code input means may not be verified by the computer system. An example of lack of synchronism between the apparatus and the computer system may occur in case the individual intentionally or unintentionally causes the biometrical sensor means to generate said first code inevitably causing the controller means of the apparatus to generate the first binary code and in case no transmission or input of the first binary code to the computer system is established, the apparatus and the computer system are no longer in synchronism, as next time the apparatus performs a verification of the identity of the individual by the generation of the first binary code by means of the dynamic binary code conversion algorithm, the computer system at its end generates the second binary code conforming to and matching the first binary code previously generated by the apparatus as the individual intentionally or unintentionally caused the biometric sensor means to generate the first code.

In order to ensure that the apparatus and the computer system are always operated in synchronism, the computer system further includes, according to the presently preferred embodiment of the computer system according to the first and the second aspect of the present invention, a second database including a sequence of binary codes generated sequentially by means of said dynamic binary code conversion algorithm, and said computer system comparing said first binary code with said sequence of binary codes contained in said second database for verifying the identity of said specific individual provided said first binary code is not matching said second binary code.

The transmission between the apparatus and the computer system may, due to the inherent tamper proof and copying safe verification due to the dynamic binary code conversion algorithm, be carried out without using any encryption and decryption. Furthermore, provided e.g. a wireless link, such as a GSM or satellite based communication link be used, the multiplicity of the information transmitted through the system inherently ensures safety and security. However, according to one embodiment of the computer system according to the first and the second aspect of the present invention, the system further comprises encryption and decryption means controlled by said controller means for performing said communication from said controller means to and from said external computer system in encrypted state according to e.g. DES encryption or other public or non-public encryption keys.

As mentioned above, the communication between the apparatus and the computer system may be carried out in accordance with any communication protocol and consequently, the first and the second communication means of the apparatus and the computer system, respectively, may be implemented as a parallel communication interface, a serial communication interface, an SPI, an I2C, an USB, a wireless communication interface such as blue tooth, an infra red or RF communication.

The above object together with together with numerous advantages and features and further objects which will be evident from the below detailed description of the present invention are in accordance with a third aspect of the present invention obtained by means of an apparatus for use in a computer system for identifying a specific individual relative to said system using a biometric characteristic of said specific individual, comprising:

a housing defining an outer surface, a biometric sensor means for generating a first code in response to the detection of said biometric characteristic of said specific individual, said biometric sensor being mounted in said housing and being exposed at said outer surface, a controller means mounted in said housing and including a memory for storing said first code and a dynamic binary code conversion algorithm, said controller means being electrically connected to said biometric sensor means, a first communication means mounted in said housing and electrically connected to and controlled by said controller means for establishing communication between said apparatus and said computer system, a power supply means electrically connected to said biometric sensor means, said controller means, and said first communication means for the supply of electric power thereto, and said controller means performing, when receiving a code from said biometric sensor means a comparison of said code with said first code stored in said memory and provided said comparison verifies the identity between said code and said first code a generation of said first code into a first binary code by means of said dynamic binary code conversion algorithm and outputting said first binary code from said apparatus by means of said first communication means to said computer system.

Equivalently, the above object together with together with numerous advantages and features and further objects which will be evident from the below detailed description of the present invention are in accordance with a fourth aspect of the present invention obtained by means of an apparatus for use in a computer system for identifying a specific individual relative to said system using a biometric characteristic of said specific individual, comprising:

a housing defining an outer surface, a biometric sensor means for generating a first code in response to the detection of said biometric characteristic of said specific individual, said biometric sensor being mounted in said housing and being exposed at said outer surface, a controller means mounted in said housing and including a memory for storing said first code and a dynamic binary code conversion algorithm, said controller means being electrically connected to said biometric sensor means, a display means mounted in said housing and being exposed at said outer surface, said display means being electrically connected to and being controlled by said controller means, a power supply means electrically connected to said biometric sensor means, said controller means, and said display means for the supply of electric power thereto, and said controller means performing, when receiving a code from said biometric sensor means a comparison of said code with said first code stored in said memory and provided said comparison verifies the identity between said code and said first code a generating a first binary code by means of said dynamic binary code conversion algorithm and displaying said first binary code converted into an alphanumeric number, preferably a decimal number constituting a Pin code on said display means.

The apparatuses according to the third and the fourth aspects of the present invention basically constitute a portable or stationary apparatus as discussed above constituting an element of the above described computer system according to the first and the second aspect of the present invention and therefore, no further discussion of the apparatuses according to the third and fourth aspects of the present invention are given.

The above object together with numerous advantages and features and further objects which will be evident from the below detailed description of the present invention are in accordance with a fifth aspect of the present invention obtained by a method of identifying a specific individual relative to a system using a biometric characteristic of said specific individual, comprising:

i) providing at least one apparatus including:

a biometric sensor means for generating a first code in response to the detection of said biometric characteristic of said specific individual, a controller means including a memory for storing said first code and a dynamic binary code conversion algorithm, said controller means being electrically connected to said biometric sensor means, a first communication means and electrically connected to and controlled by said controller means for establishing communication between said apparatus and said computer system, a power supply means electrically connected to said biometric sensor means, said controller means, and said first communication means for the supply of electric power thereto, ii) said computer system including a first database containing said dynamic binary code conversion algorithm, and a second communication means for establishing communication between said computer system and said apparatus, iii) the method comprising:

when receiving a code from said biometric sensor means performing a comparison of said code with said first code stored in said memory and provided said comparison verifies the identity between said code and said first code generating a first binary code by means of said dynamic binary code conversion algorithm and outputting said first binary code from said apparatus by means of said first communication means to said computer system, and said computer system, when receiving said first binary code from said apparatus by means of said second communication means, generating a second binary code by means of said dynamic binary code conversion algorithm and verifying the identity of said specific individual provided said second binary code matches said first binary code.

The above object together with numerous advantages and features and further objects which will be evident from the below detailed description of the present invention are in accordance with a sixth aspect of the present invention obtained by a method of identifying a specific individual relative to said system using a biometric characteristic of said specific individual, comprising:

i) providing at least one apparatus including:

a biometric sensor means for generating a first code in response to the detection of said biometric characteristic of said specific individual, a controller means and including a memory for storing said first code and a dynamic binary code conversion algorithm, said controller means being electrically connected to said biometric sensor means, a display means being electrically connected to and being controlled by said controller means, a power supply means electrically connected to said biometric sensor means, said controller means, and said first communication means for the supply of electric power thereto, ii) said computer system including a first database containing said dynamic binary code conversion algorithm, and a code input means, iii) the method comprising:

when receiving a code from said biometric sensor means performing a comparison of said code with said first code stored in said memory and provided said comparison verifies the identity between said code and said first code generating a first binary code by means of said dynamic binary code conversion algorithm and displaying said first binary code converted into an alphanumeric number, preferably a decimal number constituting a Pin code on said display means, and when receiving said first Pin code input by means of said code input means, generating a second binary code by means of said binary code conversion algorithm and verifying the identity of said specific individual provided said second binary code matches said first binary code reconverted from said Pin code.

BRIEF DESCRIPTION OF THE DRAWINGS

The present invention is now to be described in greater detail with reference to the drawings, in which.

DETAILED DESCRIPTION

Figure 1:
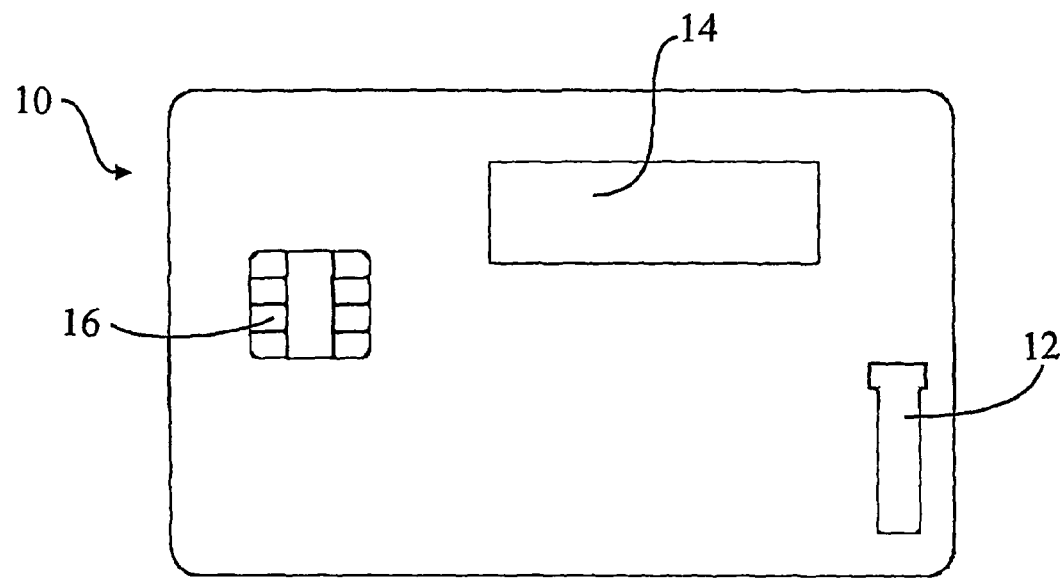
FIG. 1 illustrates a smart card according to the present invention.

FIG. 1 illustrates a smart card constituting the presently preferred embodiment of the apparatus according to the invention and embodied as a prototype embodiment. The smart card is designated the reference numeral 10. The smart card is based on IEC 7810, card type ID-1 and IEC 10 436-1 defining the physical dimensions of the card. (ISO 7810:75 (e)). In the presently preferred embodiment of the present invention, the card has a thickness of approximately 5 mm. The overall dimensions of the card is 85 mm×55 mm×4 mm and is, as shown in FIG. 1 the card has a rectangular configuration.

However, embodiments, wherein the overall geometrical configuration being circular, elliptical, square, triangular, hexagonal, pentagonal or spherical, may be envisioned.

The card 10 includes a fingerprint sensor 12 for registering an individual's identity by means of fingerprint information. However, the sensor 12 may be replaced by any sensor for sensing biometric data for the verification of an individual's identity. Sensors of this type have been described in publications such as WO 02/074168 and WO 01/150660, both publications hereby incorporated in the present specification by reference in their entirety.

Also included in the card is a display designated the reference numeral 14. The display 14 is used for inputting information to the user, such as status information or Pin codes as will be described later.

The card 10 further includes a smart card interface 16 for interfacing to other systems.

When the card is first used, the card must be initialised, i.e. the card must be supplied with the reference fingerprint or other biometric data for correct identification of the card holder.

The initialisation process comprises the following steps:
1) Turning on the card.
2) The display 14 displays the message 'ready'.
3) The user moves a specific finger across the biometric sensor 12.
4) Depending on the success of the sensing of the fingerprint, the display 14 displays either 'good' or 'error'.
5) The user again moves the same specific finger across the biometric sensor 12 to verify the finger print.
6) The display 14 then displays either the message 'good-1' or 'error', provided the message is 'error', the user must repeat the steps 3-5.
7) The user again verifies the fingerprint by moving the specific finger across the finger print sensor 12.
8) Provided the fingerprint is verified, the display 14 displays the message 'good-2'.
9) An 8-figure number is now shown in the display, which number is transferred via the internet function to the security system of PI-Card.

Figure 2:
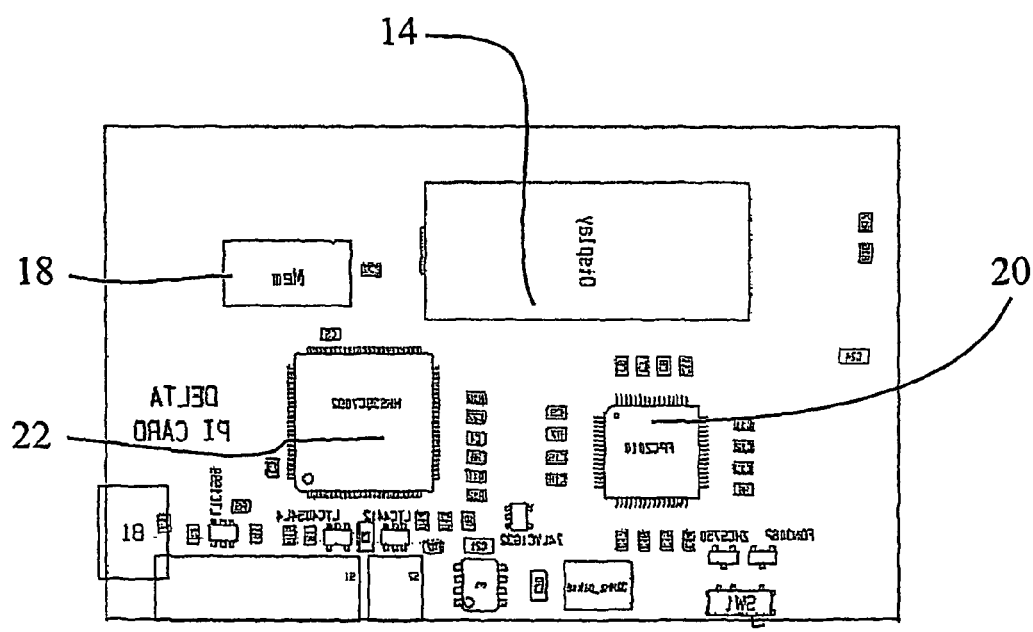
FIG. 2 is a schematic view of the components on the smart card in FIG. 1.
Figure 3:
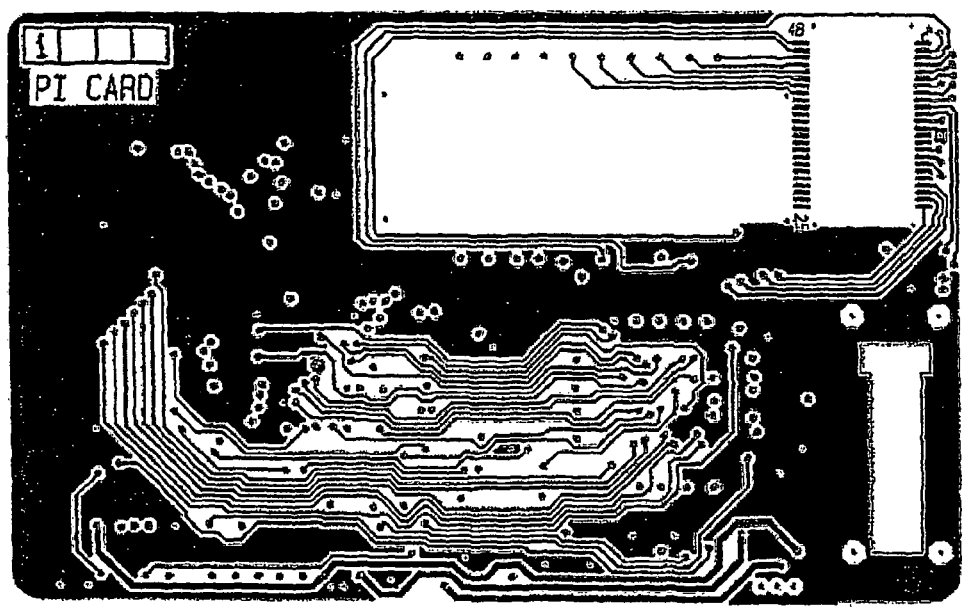
FIG. 3-6 is schematic views of the four layers of the printed circuits on the smart card in FIG. 1.
Figure 4:
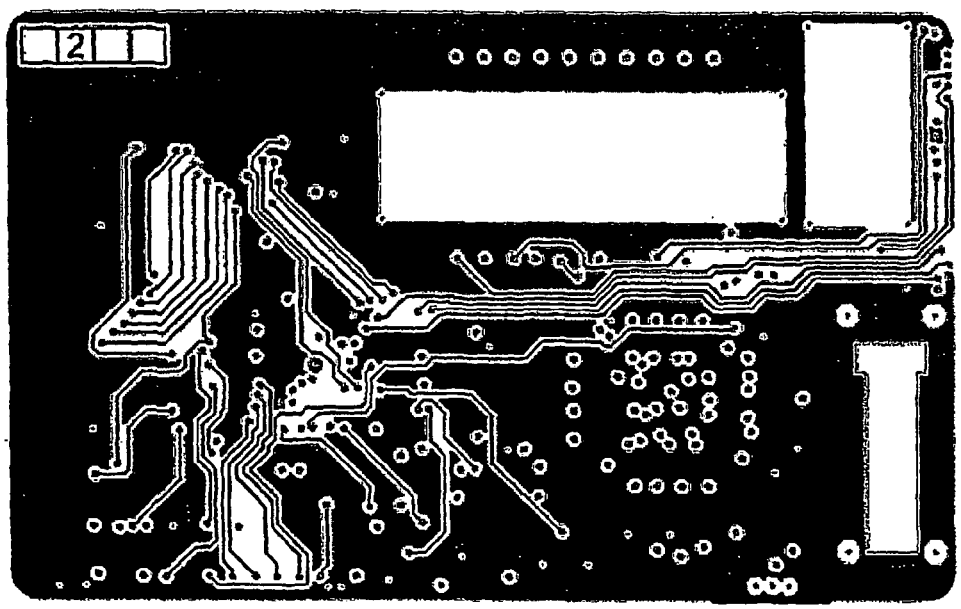
Figure 5:
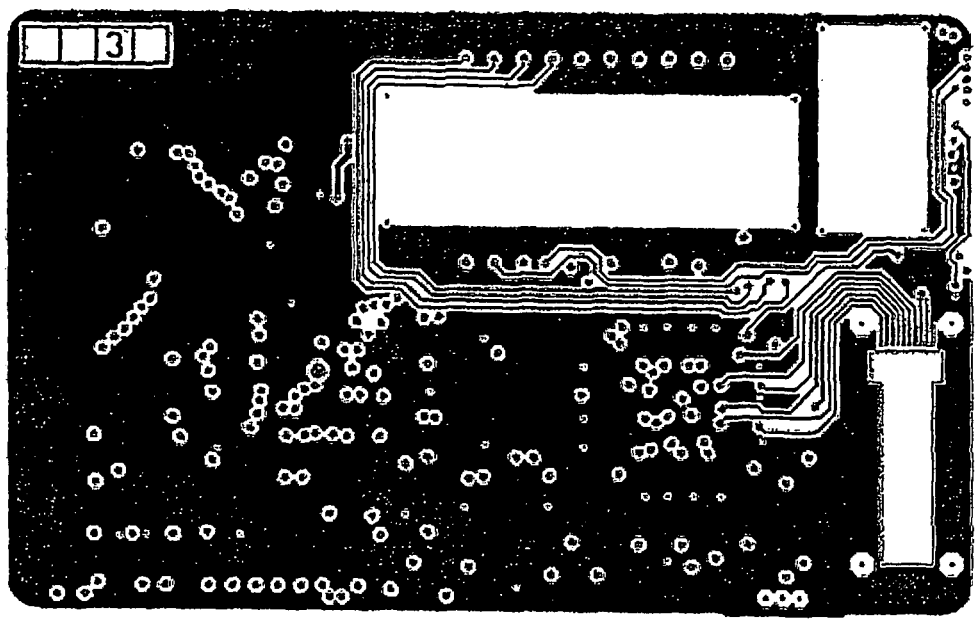
Figure 6:
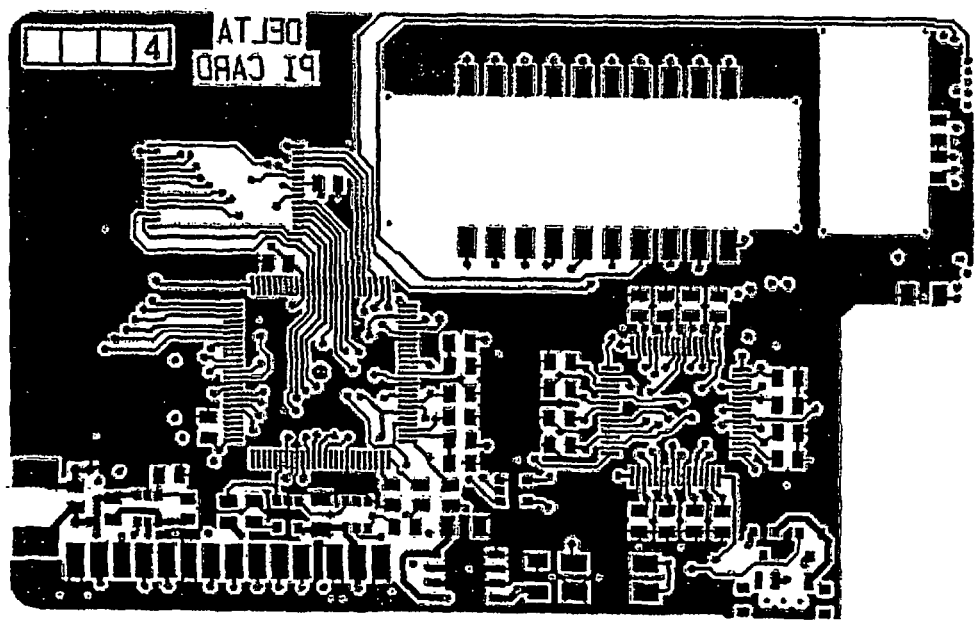

FIG. 2 is a schematic view of the components comprised within the card 10 and FIGS. 3-6 illustrates the four-layer print for the establishment of the electrical connections between the components illustrated in FIG. 2.

EXAMPLE

The prototype embodiment of the apparatus described above with reference to FIGS. 1-6 was made from the following components:

| Component | dev. | art. | description |
|---|---|---|---|
| C1 | 0805 | 100 nF | capacitor |
| C2 | 1206 | 1 uF | capacitor |
| C3 | 0805 | 470 nF | capacitor |
| C4 | 0805 | 470 nF | capacitor |
| C5 | 0805 | 470 nF | capacitor |
| C6 | 0805 | 470 nF | capacitor |
| C7 | 0805 | 470 nF | capacitor |
| C8 | 0805 | 470 nF | capacitor |
| C9 | 0805 | 470 nF | capacitor |
| C10 | 0805 | 470 nF | capacitor |
| C11 | 0805 | 470 nF | capacitor |
| C12 | 0805 | 470 nF | capacitor |
| C13 | 0805 | 470 nF | capacitor |
| C14 | 0805 | 470 nF | capacitor |
| C15 | 0805 | 470 nF | capacitor |
| C16 | 0805 | 470 nF | capacitor |
| C17 | 0805 | 470 nF | capacitor |
| C18 | 0805 | 470 nF | capacitor |
| C19 | 0805 | 470 nF | capacitor |
| C20 | 1206 | 10 uF | capacitor |
| C21 | 1206 | 10 uF | capacitor |
| C22 | 0805 | 10 nF | capacitor |
| C23 | 0805 | 100 nF | capacitor |
| C24 | 1206 | 10 uF | capacitor |
| R1 | 0805 | 3K8 | Resistor |
| R2 | 0805 | 470K | Resistor |
| R3 | 0805 | 128K | Resistor |
| R4 | 0805 | 539K | Resistor |
| R5 | 0805 | 333K | Resistor |
| R6 | 0805 | 10K | Resistor |
| R7 | 0805 | 10K | Resistor |
| R8 | 0805 | 10K | Resistor |
| R9 | 0805 | 0R | Resistor |
| R10 | 0805 | 100K | Resistor |
| R11 | 0805 | 0R | Resistor |
| R12 | 0805 | 0R | Resistor |
| R13 | 0805 | 0R | Resistor |
| R14 | 0805 | 0R | Resistor |
| R15 | 0805 | 100K | Resistor |
| R16 | 0805 | 1K | Resistor |
| R17 | 0805 | 10K | Resistor |
| 3 | | | 3.3 Vreg Regulator |
| 32 MHz_pakke | | | X-tal |
| 74LVC1G32 | | | 2-Input or gate |
| B1 | | | terminals for the battery |
| Display | | | display 7 segment, 8 cifre |
| FDN306P | | | Mosfet |
| FPC2010 | | | Finger print controller |
| HMS39C70 92 | | | CPU ARM7 core |
| LTC1998 | | | battery monitor |
| LTC4054L4.2 | | | battery charger |
| LTC4412 | | | power controller |
| Mem | | | RAM |
| S1 | | | connector to program the CPU |
| S2 | | | connector to connect an external power |
| S3 | | | connector to connect the swipe sensor, is not present on the diagram |
| SW1 | | | contact to turn on the card |
| ZHCS750 | | | Schottky diode |
| IC1 | | | display driver |

A memory chip module 18 is included in the circuit for storing the data related to the finger print as recorded by the finger print sensor 12. In the presently preferred embodiment of the present invention, a controller 20, specifically FPC 2010 for controlling the finger print sensor 12, in the presently preferred embodiment of the present invention constituted by a sensor from the company named finger print cards. The controller 20 is the only unit or module connected to the sensor 12.

A processor 22 is also located on the card 10 for communicating with the controller 20. In the presently preferred embodiment of the present invention, the processor 22 is a processor including an ARM7 processor core supplied from the company HYNIX, with the part named HMS39C7092. The processor includes 92-kb flash memory.

An algorithm for calculating a secure and anonymous Pin code has been implemented and delivered to the processor 22. In the present context, the processor is construed to be a generic term covering everything from the smallest micro controller and up.

The finger print sensor 12 is of the swipe sensor type chosen due to its compactness, low cost and power down ability. the sensor has a resolution of 152×32 pixels defining an active area of 10,64×2,24 mm with a resolution of 363 DPI. Each pixel having a resolution of 8 bits. The power consumption of the swipe sensor in the active state is approximately 45 mA and in the non-active state approximately 5 uA.

The display 14 includes an indication area for indicating the remaining battery capacity, as known from e.g. cellular or mobile phones. The display 14 may display a warning when the battery voltage drops below a specific level indicating that the battery needs to be recharged. In case the battery is not recharged within a specific time limit and the card 10 is not turned off, the card 10 will be powered down by the processor 22. The card is placed in an adapter for recharging the battery. The adapter may be constructed so as to be able to plug in to AC mains in any country, i.e. the adapter may be plugged into a 110 V AC 60 Hz or 230 V AC 50 Hz AC mains. The battery may be recharged by the mains supply. Alternatively the battery may be recharged by kinetic energy, for instance when the individual carrying the smart card 10 walks, kinetic energy may be converted to electrical energy used for recharging the battery. Further alternatively the smart card 10 may include solar cells for converting solar energy to electrical energy for recharging the battery.

The battery may be of a lithium ion polymer for enabling recharging of the battery while minimizing the memory effect of the battery. In the presently preferred embodiment of the invention, the battery has a capacity of approximately 80-100 mAH.

An individual using the smart card 10 according to the present invention may use the PIN-code generated on the smart card 10 for gaining access to secure systems, such as financial transactions or secure areas, provided of cause the individual is properly authorised.

A software implementation of an algorithm for calculating a code comprising numbers is included in the internal memory of the processor 22 in accordance with the present invention. The algorithm calculates a valid code based on three number series, one provided by a random number generator in the processor 22 on the smart card, one generated by an external computer and one chosen by the company insuring the card or determined by e.g. an account number, a social security number, or any other specific individual identifying integer or number. Generally, the algorithm is based on at least two constants and one variable.

The algorithm calculates a PIN-code based on the two constant and one variable for the external system to correctly identify the individual and grant access.

In use, the individual owning the card 10, and having initialised the card with his or her fingerprint, powers up the card, either by activating a switch or simply by touching the fingerprint sensor 12. The smart card then requires the individual to provide a fingerprint to the fingerprint sensor 12. The controller 20 then compares the newly sensed fingerprint with the fingerprint stored in the memory 18.

Provided the comparison results in a match, a valid PIN-code is calculated and provided to the individual, preferably by displaying the PIN-code on or in the display 14.

Provided the comparison does not result in a match, an error message is displayed in the display 14. The software provided in the smart card may include a limitation of how many times an individual may attempt to obtain a valid PIN-code without providing a valid fingerprint.

The smart card 10 according to the present invention is no limited to being able to generate PIN-codes for a single system. Each smart card 10 may be used for granting access to any number of systems. An individual may use the smart card 10 for gaining access to e.g. a private online banking system and an IT-system at work. A selection may be possible, e.g. via at least one key, for selecting a specific system to generate a PIN-code for.

In the presently preferred embodiment of the present invention the display 14 may display up to 8 characters in one row and may include background light for enabling the smart card 10 to be used in low-light conditions.

Embodiments wherein PIN-codes having a variable length or a length different from 8 characters may be envisioned, and is considered a part of the present invention.

As the fingerprint is not transmitted from the card, or read in a device separate from the card, the actual identity of the individual is therefor not compromised.

The card 10 may include a module for transmitting the generated PIN-code. The module may be constituted by a wireless module, alternatively a module for wire connection to an external system.

The algorithm comprises a number of mathematical functions combined with bit manipulation, e.g. number reflection, for combining specific sequences of codes used individually and in a specific order. The smart card according to the present invention may be used with two types of bit manipulation, the first being time dependent and the other being constant, both methods having a high security.

The software application implemented according to the present invention is built up around three independent databases.

The first database designated A comprises information relating to persons to each of the smart cards operated by the vendor or company. The records in the database A are designated accounts.

The second database designated B comprises data relating to the individual cards such as the last used code as well as the two constants determined at the initialisation process. The database further comprises codes for security level, e.g. how many codes to accept before the card is perceived as out of synchronisation. The database is refreshed at each approved access by the user.

The third database designated C comprises the sequence of codes to be approved at plug-in. The sequence of codes reduces in case of failing to authenticate the user. In case the number of available codes are reduced to zero, the card and the server is brought out of synchronisation meaning that the smart card will be blocked and a resynchronisation process is required.

Dividing this information into three databases provides a high level of security at the administration, enabling more than one individual to administrate the system, each individual having different rights for the individual databases. Also, the personal information may be excluded thereby providing anonymous access to systems where it is appropriate that the individual may not be identified, e.g. medical journals for research.

There is no need for the card and the authentication system to be in physical contact since the card includes a power source constituted by a battery, and comprises the same algorithm as the server for calculating the sequence of codes provided that the card and the server does not loose synchronisation due to e.g. too many erroneous log ins. Currently, credit cards and debit cards only allow three erroneous Pin codes before the card is blocked, however, in case the biometric smart card according to the present invention, the number of erroneous codes supplied by the user may be higher due to the added security of the biometric sensor included in the card.

In Annex 1, the software used for operating the prototype embodiment described above with reference to FIGS. 1-6 and described in the above example is listed.

Figure 7:
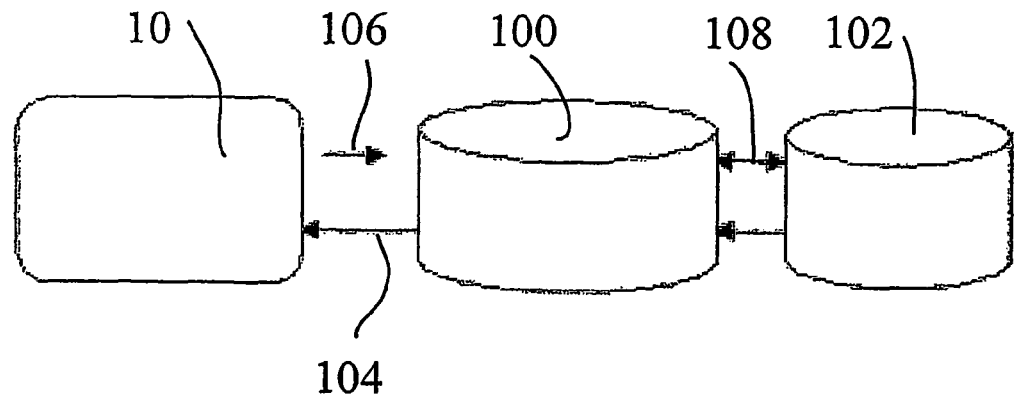
FIG. 7 is an illustration of the communication between the card, the authentication server and the application server.

FIG. 7 illustrates the communication between a smart card and an authentication server 100 and an application server 102. Before the card is used for the first time, the card must be initialised by a sequence as described previously. The authentication server 100 sends a first random number and one constant to the card 10 illustrated by the error 104. The transfer of the first random number and the one constant may be performed using a smart card interface, a USB interface, a wireless interface, such as blue tooth, IR or RF, the mentioned communication methods may be substituted by other methods of communication as is obvious to a person skilled in the art.

Figure 8:
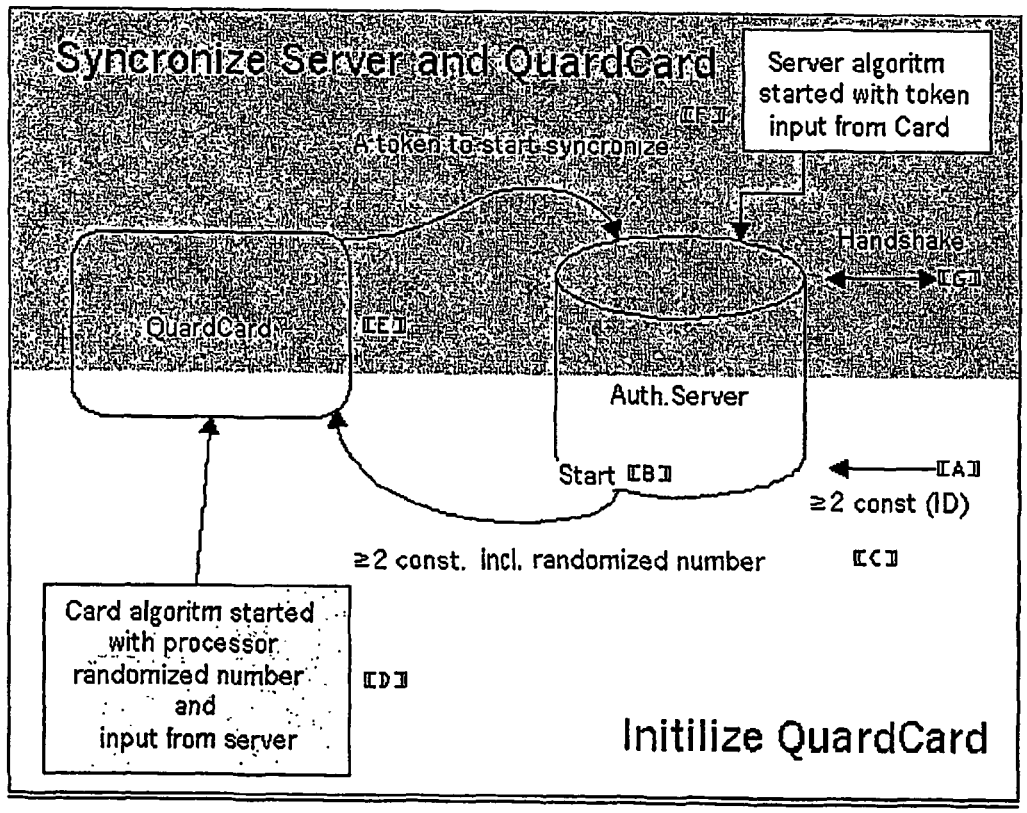
FIG. 8 illustrates the initialisation and synchronisation process.
Figure 9:
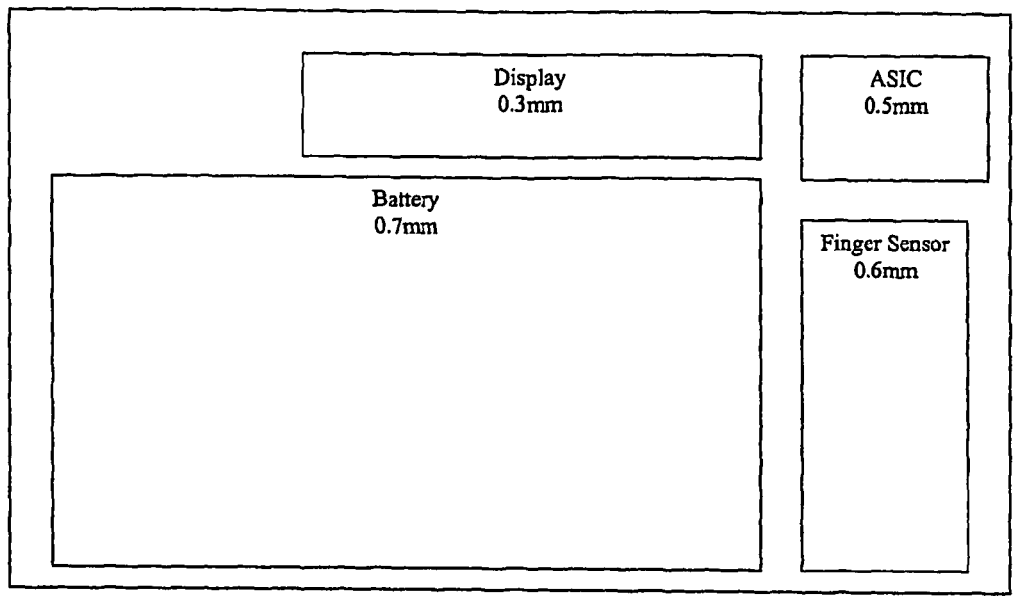
FIG. 9 illustrates a lay out of a card.
Figure 10:
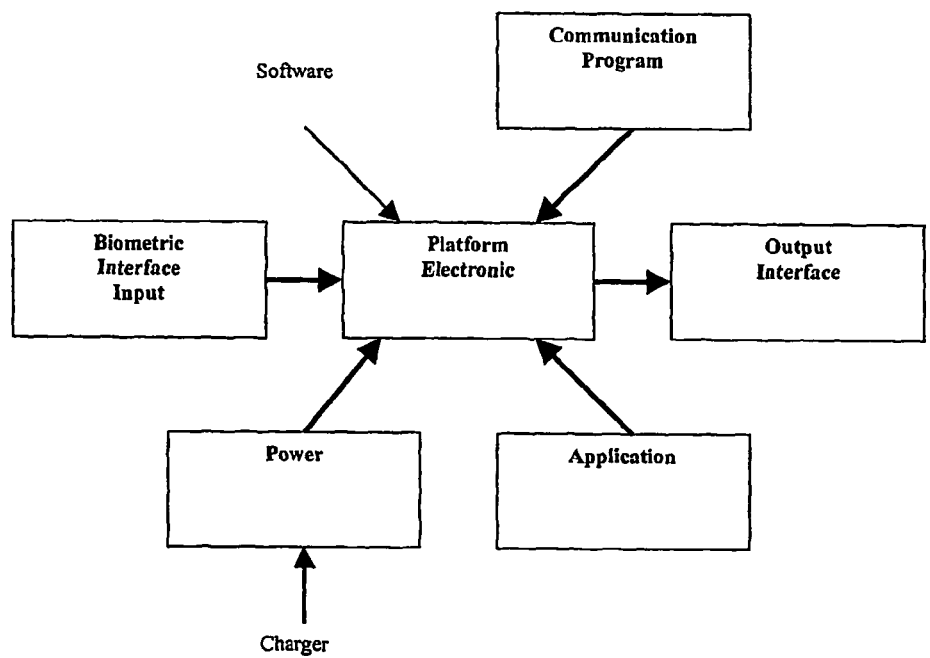
FIG. 10 illustrates the card in block diagrammatic form.

FIG. 8 illustrates the initialisation and synchronisation of a card 10 with the authentication server 100. The illustration is divided in two fields, one grey and one white. The lower white field illustrates the initialisation that may only be performed once for each card. The upper grey field illustrates the synchronisation performed repeatedly with each card.

When initialising the authentication server 100 indicated by the error A, at least one constant is provided to the authentication server, e.g. an account number, area number or other identification number. The information is supplied by the application server that may be the propriety of a bank, passport control or other public authority.

The initialisation process is started and information regarding a specific card is established in the authentication server at the point B in FIG. 8.

The card is placed in a smart card reader and using the smart card interface receives the constant from the application server along with a randomised number from the authentication server. The card generates the third number required for calculating the codes or tokens. In the presently preferred embodiment, the third number is a randomised number, however, the number may also be extracted from the finger print sensor. Having the three required numbers, where at least one may be a variable, the sequence of tokens or codes may be calculated. The sequence of tokens or codes will be specific for each card. After the initialisation process, the card will be locked meaning that it will no longer be possible to perform right operations to the internal memory.

The authentication server must be provided with a token or code from the card for calculating the sequence of tokens or codes that the card will supply. It is possible to pre-initialise a larger number of cards without randomisation, preferably used in situations where a lower level of security is sufficient.

In the box designated D during the initialisation, the finger print sensor must recognise the fingerprint three times, whereafter the software will load the fingerprint into the internal memory. This will lock the internal memory as described above. Due to security considerations, the authentication server may not activate the account relating to the card before the card has been synchronised. This process is ensured as the third number that may be a variable is transferred from the card to the authentication server at the initial synchronisation.

When the finger print sensor is activated and the authenticity of the finger print supplied to the finger print sensor has been approved, the algorithm generates the next token in the sequence based on the previous token or code stored in the cards memory.

The card may be provided with a variety of output media for outputting the tokens or codes. In the presently preferred embodiment a display is used for displaying the Pin codes or tokens to the user, however, embodiments involving sound, radio signals or light may be included on the card. Whatever the output means may be, none of the information outputted from the card relates directly to the biometric characteristics but to a code or token, which is further altered dynamically thereby providing anonymity to the user owning the card.

For the card to access the application server, the card needs to be synchronised with the authentication server. This is performed in each instance after a procedure adapted for the card suppliers security needs. The server algorithm is identical to the algorithm implemented on the card. The server is provided with a token or code from the card, which is then used as the first step in the calculation of the sequence of codes or tokens produced also by the card.

Provided the token or code supplied from the card is validated by the authentication server, a hand shake is supplied from the authentication server to the application server and the card owner or the card is then logged in.

If the card and the authentication server is brought out of synchronisation, e.g. by supplying more than ten erroneous codes or tokens, the procedure of transferring the next token from the card to the authentication is repeated. Since both the card and the authentication server have the same sequence of codes or tokens, the authentication server may be supplied with a token from the card and then be able to calculate where in the sequence the card is. Subsequently, the authentication server will be in synchronisation with the card.

In the presently preferred embodiment of the present invention, the preferred method of using the card is to hold a respective thumb and index finger on each side of the card where the thumb is placed over a marked side, then pulling the card with the opposite hand so that the pressure and placement of the finger onto the sensor is substantially identical each time, also the speed of the finger being moved across the swipe sensor is substantially identical each time. Provided an array sensor is used, a marking or guidelines will be sufficient.

The algorithm for calculating the Pin codes or tokens is as follows:

```
1:      for (my $i=0;$i<=$sekvens;$i++){
2:          $g=0; $v=100000000000; $d=0;
3:          $x=($a*$x)+$c;
4:          while($x>=1000){$d=$x-(10*floor($x/10));
5:          if($x<$v){
```

```
6:      $g=(10*$g)+$d;$v=$v/10;
7:      }$x=($x-$d)/10;
8:      }$x=$g;
9:      }
```

The algorithm is also included in the annex 1, vide page 46 of the annex 1.

The variable $ sekvens designates the number of tokens calculated by the server. The variable $a designates a constant, such as a bank account or birthday. $b designates a randomly chosen constant. The algorithm implemented on the card is similar to the one implemented on the server, however, the variable $sekvens is limited to the value 1, meaning that only one Pin code is calculated one at a time.

For improving the security of the sequence of the algorithm, permutation on the variable $d may be applied, meaning the after calculating a sequence of codes, a random or psedo-random choosing of a new order of codes may be performed. If a third person then obtains knowledge of the sequence of codes this knowledge is still useless unless the permutation of the variable $d is also known.

At each use of the card 10 , a code is supplied to the authentication server 100 illustrated by the arrow 106. The authentication server and the application server 102 are constantly in communication illustrated by the double arrow 108.

The card 10 may be used in a variety of situations, not only in situations requiring high level of security. The procedure of synchronisation is a part of the security of the card and also provides flexibility in the level of security. If a high level of security is required, the resynchronisation may be monitored, e.g. by requiring the user to personally appear before a security administrator and use the card for supplying a new code manually entered by a third person to the authentication server. In cases where a lower level of security is accepted, the resynchronisation may be performed using a telephone or the internet.

In the presently preferred embodiment of the present invention, the smart card 10 includes an ARM 7TDMI32 bit RISC processor for performing the calculations according to the algorithm as described earlier. Also memory is included on the card, either of flash type or EEPROM, RAM or ROM type memory. The display included on the card 10 is 7 segment, 8 digits display having the dimension 35 mm×15 mm.

The finger print sensor is a capacitive swipe sensor having ESD protection of >15 kV. The battery is a lithium iron polymer rechargeable battery with a capacity of 10-100 mAH also including a battery recharging circuit.

The card must, in the presently preferred embodiment of the present invention comply with the International Standard Organisation's standard ISO 7810/7816/10536/14443.

The card may include RF communication means for communicating with an external system.

The micro controller may include an operating system COS, which may be LINUX or JAVA based. Having an operating system allows for software applications to be developed independent of the hardware platform. New software applications may be developed and downloaded to the card's memory using the smart card reader/writer or other data transferring medium.

The card may include an on/off function for being connected with the swipe sensor such that activating the sensor by applying e.g. a finger to the sensor activates the processor. The sensor may measure heat or electrical conductance from the finger. The second time a finger touches the sensor, the finger print sensor will sense the finger print from the individual. This will ensure that the card is not activated when stored in e.g. a wallet. Also, anybody can activate the card, but only the rightful owner may have his or her finger print recognised and thereby accessing the Pin codes on the card.

The card may power down after a specific period of time such as 30 seconds after the last active operation.

The display may display other than numerals, e.g. the display may be of a type capable of displaying images, such as black and white images or colour images enabling the user to display photographs, such as those found in passports. The display may further be pressure sensitive enabling the user to interact with e.g. a menu system for configurating the card. In the presently preferred embodiment of the present invention, the display uses 3.3 V and is turned off 30 seconds after the last operation.

In the presently preferred embodiment of the present invention, two batteries from the company Worliy Energy Cells, each having a capacity of 45 mAmpH giving a total capacity of 90 mAmpH. These batteries are rechargeable and have a dimension of 43 mm×40 mm×1 mm. Studies have shown that several hundred Pin codes or tokens may be generated on a single charging of the batteries. In order to supply the components with a current of 3.3 V, a voltage regulator for regulating the battery current of 3.7 V down to 3.3 V with a maximum current capacity of 500 mAmp.

A sliding switch for powering up or turning off the card may be included on the card. The switch may substitute the finger print sensor sensing a contact with a finger for powering up the card.

A central server authenticates the Pin code as provided by the smart card and inputted by a user or individual owning the smart card. The server and the smart card both comprise an algorithm for generating a sequence of random numbers based on the two constants for calculating these sequences. When the card is initialised the two constants and the one variable are loaded or read into the memory on the smart card and also stored on the server. The issuer of the card may choose one of the two constants, e.g. the constant may be an account number or other personal identification, while the other constant and the one variable are generated by randomisers present in the server and the smart card, respectively.

Obviously, the number of constants and variables used in the dynamic binary code conversion algorithm may be altered for providing a unique dynamic binary code conversion algorithm. Examples of alternative dynamic binary code conversion algorithms are listed below.

One constant is formed by the server and the other is formed by the smart card. The constants are read into the respective other device for allowing each of the systems to obtain the two constants. The step of exchanging the random numbers generated in the smart card and server, respectively, is a way of the server to initialise the smart card and for the smart card to initialise the server.

The server may accept only a limited number of Pin codes, such as 10 meaning that the next 10 codes generated in the smart card may be used as Pin codes for logging in or validating the identity of the user in the system. When the smart card is activated and the identity of the user has been established by using the built in biometric sensor, a Pin code is generated and displayed on the display 14. The number of available Pin codes is decremented one meaning that nine remaining codes may be used for logging in. When using a Pin code for logging in, the server resets and accepts the next 10 Pin codes in the sequence.

However, if 10 Pin codes are generated without using any for logging into the system, the smart card and the server will loose the synchronisation and the eleventh generated Pin code will be refused by the server.

For re-establishing the synchronisation, the owner of the smart card may contact a system administrator or other authority and provide the next generated Pin code for bringing the server up to the point in the sequence of Pin codes. This establishes a synchronisation between the server and the smart card. Since only the rightful owner of the smart card may generate a valid Pin code, the synchronisation will only be possible by the owner himself or herself. As the smart card comprises a processor and internal memory, the smart card may include several constants and/or algorithms for different and independent systems, e.g. the card may be used by an employee in a company for gaining access to the company or the company's internal IT system as well as the employee's personal bank account. The employee or owner of the card may be able to choose which system to generate a valid Pin code for either via the display or other selection means such as buttons included on the surface of the smart card.

The card in a further preferred embodiment has a thickness of approximately 1 mm and may be bent requiring the biometric sensor to be placed as close to the edge of the card as possible in order to avoid braking the sensor. The stiffness of the card near the edge provides stability to the sensor.

All biometric sensors require a certain amount of sensitivity and the signals to be similar to the previously supplied signals. By supplying the card with a graphical indication of where the finger should be placed on the finger print sensor ensures that the user may perform a movement of the finger substantially identical each time the card is used.

The above described presently preferred embodiment of the apparatus according to the present invention was implemented as a prototype having the outer dimensions of an ISO standard credit card, however, having a total thickness of approximately 4 mm-5 mm. It is contemplated that the thickness of the prototype embodiment may be reduced to no more than 1 mm as will be described below and at the same time, the credit card be configurated as a flexible and bendable credit card which is not subjected to being deteriorated by e.g. bending in a wallet or the pocket of the individual carrying the credit card or smart card apparatus.

Since the card is suppose to be in a wallet, the next generation of the Pin code generator card is going to include 2 major demands.

The card must not be a stiff card, it must be able to be bent, so much that the user is not going to break the card, when it is in the users wallet.

Secondly the card must not exceed the thickness of 1 mm.

To fulfill those demands, the technique that was used in the prototype can not be used.

In the prototype Pin code card standard components were used, such as a common glass display, standard battery, and other common standard electrical components.

Display

The display is to be a rather large component on the card, and will probably, be over the middle of the card, which means that when the card is being bended the display is also being bended.

The Display could have any size, and any number of digits.

There a several technologies, that is using what is known as, flex and plastic display. The essence of those displays is, that they are looking like a piece of thin plastic, and are very thin, down to 0.3 mm, and are very flexible, meaning that they can be bent, without being broken.

Electronic

The problems using standard components on the card are:

The components can not be bent.

They are very thick, since they are in a house of black plastic.

The security is very low, since the fingerprint controller and microcontroller is in 2 different components. It is possible to strip the card, and hacked it.

Many components—high cost

The way to eliminate these problems is to make an ASIC (Application Specific Integrated Circuit).

An ASIC is a user specific component that can be digital, analog or a mix.

The biometric sensor (fingerprint sensor) generates an analog signal, when the user swipes his/her finger. Preferably, the ASIC includes as a front end and A/D connector.

Furthermore, the ASIC showed include the Controller, the micro processor, the Memory and the display driver.

The advantage of an ASIC is that the security level is very high since its. It is not possible to break into the circuit.

Furthermore the physical size of such an ASIC is about 4*4 mm as a naked die. Since it is made out of silicium it can not be bent, so the ASIC will be placed in one of the sides of the card. The power use of an ASIC instead of the 4 standard components is also an important factor. The ASIC, depending on what process it is made in (e.g HYNIX 0.18 u), uses much less power.

The power supply circuit can be made as an analog chip, or together with the ASIC.

The thickness of the ASIC is very small and below 1 mm (as a naked die), however, it is the wafer that decides the thickness of the ASIC, but if that is too thick, it is possible to back grind the ASIC, since the functionality of the ASIC is made with some mask, that is only a few micron thick.

Other Electrically Components

On the card there will be an X-tall and perhaps also addition components such as capacitors and/or resistors.

Fingerprint Sensor

It is made out of silicium that can not be bent, so the sensor must also be placed at the one side of the card and preferably at the edge thereof. Like the ASIC it is also possible to back grind the sensor, if it's to thick.

Battery

The thickness may be from 0.2 mm but of course the capacity of the battery depends on the size and thickness of the battery.

Flexprint

In order to connect the different parts electrically a flexprint technology is preferably used.

Alternatively, wire bonding may be used for connecting the pad on the ASIC to another pad.

Encapsulate

To make the card nice and protect the electronic parts it needs to be encapsulated.

Sensor Types

Relevant sensor types are:

Swipe sensor—The user must swipe a finger over the sensor that scans the user's fingerprint.

Area sensor—The user plants the finger in the sensor array area, which then scans the fingerprint or entire finger.

Iris sensor—The user looks in an eye sensor that then scans the user's iris.

Blood sensor—The characteristics of the user's blood is scanned.

DNA scanner—The DNA of the user is scanned.

Microphone—The characteristics of the user's voice is scanned.

Air—The characteristics of the user's breath is scanned or a certain smell is detected.

Keyboard—the user types in the password on the card.

Types of Power Sources

Relevant power sources are:

Battery

Capacity

Types of Charger

For recharging the power source in order to make the card work for a longer period. The following types of rechargers may be used:

Charger—connect the charger to the connectors on the card (e.g. Smart Card connectors); the implication of this is that the user of the Sensor Card must have a charger as well.

Solar Cell—A Solar Cell could be on the card to recharge the power source or may be the power source itself.

Wireless—E.g. capacity or induction coupling.

Kinetic energy—When the user walks with the card, those vibrations will recharge the power device.

Types of Storing Devices

Relevant storing devices are:

Flash—The program is burned into flash memory.

EEPROM—is another technology that can contain storing data.

OTP—One Time Programmable memory.

ROM—Read Only Memory.

In the future other types of memories might be used:

Biological memory.

Chemical memory.

Optical memory.

Types of Application

Key generator—provides the user with a unique password to e.g. a database or a restricted area. The output key is e.g. listed on a display.

Health care—The sensor card measures the user's health, and if there is a problem, it shows e.g. the telephone number of the doctor.

Personal data—all personal data e.g. date of birth, social security number etc. could be viewed on the display.

Types of Outputs

Wire plug in.—Plug in a wire, to receive the output data.

Wireless using radio frequencies (e.g. Blue Tooth)—The card can communicate wireless with e.g. an external computer.

Loudspeaker (sound)—The card sends out an audio signal (e.g. human speech), that the third part user may receive (hear).

Light (infrared, Higher-lower freq.)—E.g. communication via a laser or IrDA.

Holographic—The card makes a hologram.

Smart Card connectors—A Smart Card reader receives the output data.

Display—the data is shown on a display.

Thickness of the Sensor Card

Multiple Sensors

It is possible to have more then one sensor on the card, it could for example be 3 sensors, 2 finger sensor and a voice sensor, that verify the identity of the person.

A second sensor could also be a sensor to detect the sunlight, air pollution, rain, temperature and so on.

The sensor card could also be used as a combination of the Pin code generator and a sensor card.

ANNEX 1

UTILITY.H

```
/* Miscellaneous library functions */ ifndef __UTILITY_H
define __UTILITY_H extern void delay(int);
extern void message(char * s);
extern unsigned int battery_check(void);

#endif
```

UART.H

```
/************************************************************
                                                          
 Copyright (c) 2000 ARM Limited                           
 All rights reserved                                      
                                                          
************************************************************/

/************************************************************
*                                                          *
* The following are for the Integrator UART system. These are bits to enable *
* the functions in the Command Registers and the individual masks for the *
* returned Status registers                                *
* Register Bits - these require to be set to enable the defined functions *
*                                                          *
************************************************************/
```

```c
#ifndef __UARTDEF
#define __UARTDEF

/************************************************************/
/* UART Structure maps to register offsets                  */
/* Structure is instantiated in UART.c and placed by scatter file */
/************************************************************/ struct uart
{ volatile unsigned dr;   // @0x0
  volatile unsigned ecr;  // @0x4
  volatile unsigned lcrh; // @0x8
  volatile unsigned lcrm; // @0x0c
  volatile unsigned lcrl; // @0x10
  volatile unsigned cr;   // @0x14
  volatile unsigned fr;   // @0x18
  volatile unsigned iir;  // @0x1C
};

/************************************************************/
/* Received Status Register - RSR                           */
/************************************************************/
#define RSR_Overrun_Error  0x08
#define RSR_Break_Error    0x04
#define RSR_Parity_Error   0x02
#define RSR_Framing_Error  0x01

/************************************************************/
/* Line Control High Byte Register - LCRH                   */
/************************************************************/
#define LCRH_Word_Length_8 0x60
#define LCRH_Word_Length_7 0x40
#define LCRH_Word_Length_6 0x20
```

```
#define LCRH_Word_Length_5    0x00
#define LCRH_Fifo_Enabled     0x10
#define LCRH_2_Stop_Bits      0x08
#define LCRH_Even_Parity      0x04
#define LCRH_Parity_Enable    0x02
#define LCRH_Send_Break       0x01
```

```
/***********************************************************/
/* Line Control Medium Byte Register - LCRM                */
/* This register specifies the high byte of the Baud rate divisor */
/***********************************************************/
#define LCRM_Baud_460800   0x00
#define LCRM_Baud_230400   0x00
#define LCRM_Baud_115200   0x00
#define LCRM_Baud_76800    0x00
#define LCRM_Baud_57600    0x00
#define LCRM_Baud_38400    0x00
#define LCRM_Baud_19200    0x00
#define LCRM_Baud_14400    0x00
#define LCRM_Baud_9600     0x00
#define LCRM_Baud_2400     0x01
#define LCRM_Baud_1200     0x02
```

```
/***********************************************************/
/* Line Control Low Byte Register - LCRL                   */
/* This register specifies the low byte of the Baud rate divisor */
/***********************************************************/
#define LCRL_Baud_460800   0x01
#define LCRL_Baud_230400   0x03
#define LCRL_Baud_115200   0x07
#define LCRL_Baud_76800    0x0B
#define LCRL_Baud_57600    0x0F
#define LCRL_Baud_38400    0x17
```

```
#define LCRL_Baud_19200  0x2F
#define LCRL_Baud_14400  0x3F
#define LCRL_Baud_9600   0x5F
#define LCRL_Baud_2400   0x7F
define LCRL_Baud_1200   0xFF /***********************************************************/
/* Control Register - CR                                  */
/***********************************************************/
#define CR_Loop_Back_En   0x80
#define CR_Timeout_Int_En 0x40
#define CR_TX_Int_Enable  0x20
#define CR_RX_Int_Enable  0x10
#define CR_ModStat_Int_En 0x08
#define CR_UART_Enable    0x01

/***********************************************************/
/* Flag Register - FR                                     */
/***********************************************************/
#define FR_TX_Fifo_Empty 0x80
#define FR_RX_Fifo_Full  0x40
#define FR_TX_Fifo_Full  0x20
#define FR_RX_Fifo_Empty 0x10
#define FR_Busy          0x08
#define FR_Carrier_Detect 0x04
#define FR_Set_Ready     0x02
#define FR_Clear_To_Send 0x01

/***********************************************************/
/*Interrupt Identification Register - IIR                 */
/***********************************************************/
#define IIR_RX_Time_Out  0x08
#define IIR_TX           0x04
```

```
#define IIR_RX      0x02
#define IIR_Modem   0x01
``` endif

TYPEDEFS.H

```
#ifndef __DELTATYPEDEFS__H
#define __DELTATYPEDEFS__H

/**
 * FPC2010 type definitions
 */
typedef unsigned char u_char;
typedef unsigned char bool;
typedef unsigned char * addr8;

#endif /* __DELTATYPEDEFS__H */
```

TIMER.H

```
/* Timer library functions */ ifndef __TIMER_H
define __TIMER_H define START_TIMER0 *TSTARTR = *TSTARTR | TIMER0_MASK; // Start timer 0
define STOP_TIMER0  *TSTARTR = *TSTARTR & ~TIMER0_MASK; // Stop timer 0 extern void timer0_init(void);

endif
```

RANDOM.H

/* Random library functions */ ifndef __RANDOM_H
define __RANDOM_H

// token
define tempa 9102     // Offentlig nøgle 1
define tempc 12345678 // Offentlig nøgle 2 extern double token(double x);

/* linear congruential generator. Generator x[n+1] = a * x[n] mod m */ define RAND_INT(l,h) (((int)(random() * ((double)(h)-(l)+1))) + (l))
extern double random (void);
extern void rand_seed (unsigned int);
endif

PORT.H

/* Display library functions */ ifndef __PORT_H
define __PORT_H extern void port_init(void);
endif

FPC2010REGISTERS.H

```
//----------------------------------------------
//    Copyright (C) 2003 Fingerprint Cards AB.  All Rights Reserved
//----------------------------------------------
//
// The information contained herein is confidential property of
// Fingerprint Cards AB. The use, copying, transfer or disclosure of such
// information is prohibited exceptby express written agreement with
// Fingerprint Cards AB.
//
//----------------------------------------------
// File: fpc2010registers.h
//
// Description:         These registers are the software interface to the FPC2010
// hardware.
//
// Hardware platform: FPC6430
//
//---------------------------------------------- ifndef __FPC2010REGISTERS__H
define __FPC2010REGISTERS__H

/**
 * Interrupt/Reset interface registers
 */
#define InterruptMask              ((volatile addr8)FPC_BASE)
#define Interrupt                  ((volatile addr8)(FPC_BASE + 1))
#define SwReset                    ((volatile addr8)(FPC_BASE + 3))

/**
 * Sensor interface registers
```

```c
*/
#define SensorCommand          ((volatile addr8)(FPC_BASE + 33))
#define SensorParameter_LSB    ((volatile addr8)(FPC_BASE + 34))
#define SensorParameter_MSB    ((volatile addr8)(FPC_BASE + 35))
#define WaitCycles             ((volatile addr8)(FPC_BASE + 36))
#define StartCycles            ((volatile addr8)(FPC_BASE + 37))
#define CloseCycles            ((volatile addr8)(FPC_BASE + 38))
#define SensorReset            ((volatile addr8)(FPC_BASE + 39))
#define FingerDetect           ((volatile addr8)(FPC_BASE + 41))
#define ClockDevisor           ((volatile addr8)(FPC_BASE + 42))

/**
 * Work RAM interface registers
 */
#define WorkRAMAddrPointer     ((volatile addr8)(FPC_BASE + 64))
#define WorkRAMWriteData       ((volatile addr8)(FPC_BASE + 65))
#define WorkRAMReadData        ((volatile addr8)(FPC_BASE + 66))

/**
 * Verification result RAM interace registers
 */
#define VerResultAddrPointer   ((volatile addr8)(FPC_BASE + 67))
#define VerResultWriteData     ((volatile addr8)(FPC_BASE + 68))
#define VerResultReadData      ((volatile addr8)(FPC_BASE + 69))

/**
 * FPRAM control registers
 */
#define FP_RAM_Cmd             ((volatile addr8)(FPC_BASE + 128))
#define FP_RAM_Range           ((volatile addr8)(FPC_BASE + 130))
#define FP_RAM_Read            ((volatile addr8)(FPC_BASE + 131))
#define FP_RAM_Write           ((volatile addr8)(FPC_BASE + 132))
```

```c
/**
 * Parameter file registers
 */
#define ParameterFilePointer        ((volatile addr8)(FPC_BASE + 192))
#define ParameterFileWrite          ((volatile addr8)(FPC_BASE + 193))
#define ParameterFileRead           ((volatile addr8)(FPC_BASE + 195))

/**
 * Algorithm Calculating Hardware (ACH) registers
 */
#define ACHCmd                      ((volatile addr8)(FPC_BASE + 196))
#define AccLineOffset               ((volatile addr8)(FPC_BASE + 199))
#define AccPointOffset              ((volatile addr8)(FPC_BASE + 200))
#define TopLineLSB                  ((volatile addr8)(FPC_BASE + 201))
#define TopLineMSB                  ((volatile addr8)(FPC_BASE + 202))

/**
 * Flags for the interrupt register
 */
#define IRQ_SENSOR_FINGER_DETECT    (1<<0)
#define IRQ_FPRAM_DATA_AVAILABLE    (1<<1)
#define IRQ_FPRAM_ERROR             (1<<2)
#define IRQ_SENSOR_COMPLETE         (1<<3)
#define IRQ_MANUAL_CAPTURE          (1<<4)
#define IRQ_ACH_COMPLETE            (1<<6)

/**
 * Sensor command register (ACHCmd)
 */
#define ACHCmd_ENROL                0x3B
#define ACHCmd_VERIFY               0x5B
```

```
#define ACHCmd_ENROL_TEST           0x3F
#define ACHCmd_VERIFY_TEST          0x5F
#define ACHCmd_DELTA_XY                             0x5B
```

```
/**
 * Commands for the sensor command register (SensorCommand)
 */
#define READ_ALL_COL_BY_COL         (0x88)
#define WRITE_DETECT                (0x2E)
#define WRITE_DRIVE_C               (0xAE)
#define WRITE_ADC_REF                               (0x6E)
#define READ_INT_REGS                               (0x0A)
```

```
/**
 * Parameters for setting up the sensor.
 */
#define WAIT_REG_VALUE              172
#define START_CYCLE_VALUE      80
#define CLOSE_CYCLE_VALUE      2
#define CLOCK_DEVISOR               0
```

```
/**
 * Values for the FP RAM register (FP_RAM_Cmd)
 */
#define PREPARE_MEM_LOW_HALF   0x01
#define PREPARE_MEM_HIGH_HALF  0x02
#define WRITE_MEM_LOW_HALF     0x04
#define WRITE_MEM_HIGH_HALF    0x08
#define READ_MEM_LOW_HALF      0x10
#define READ_MEM_HIGH_HALF     0x20
```

```
/**
 * Used as parameters to functions that deals with the FP_RAM in fpc2010. LOW_HALF means
 * low memory half and HIGH_HALF means high memory half.
 */
#define LOW_HALF  0
#define HIGH_HALF 1

/**
 * Startup values for sensors registers.
 */
#define DETECT_STARTUP_VAL 0xe8 //=0x17 on sensor;  0//4    //Startup value for the detect register.
#define DRIVC_STARTUP_VAL 255  //Startup value for the drivc register.
#define ADCREF_STARTUP_VAL 192 //Startup value for the adcref register.

/**
 * Definitions for memory area sizes and offsets.
 */
#define NO_OF_TOP_LINES_REMOVED    30
#define FPC2010_WORK_RAM_SIZE     2048
#define FPC2010_VER_RESULT_RAM_SIZE 1024

/**
 * The size of a template
 */
define TEMPLATE_SIZE 676 endif /* __FPC2010REGISTERS__H */
```

FPC2010INTERFACE.H

```
//----------------------------------------------------
//   Copyright (C) 2003 Fingerprint Cards AB.  All Rights Reserved
//----------------------------------------------------
//
// The information contained herein is confidential property of
// Fingerprint Cards AB. The use, copying, transfer or disclosure of such
// information is prohibited exceptby express written agreement with
// Fingerprint Cards AB.
//
//----------------------------------------------------
// File: fpc2010interface.h
//
// Description:          Interface driver for the FPC2010 ASIC.
//
// Hardware platform: FPC6430
//
//---------------------------------------------------- ifndef __FPC2010INTERFACE__H
define __FPC2010INTERFACE__H

/**
 * Functions
 */
void UploadVerResultRAMContent(u_char *buffer);
void UploadEnrolResult(u_char *enrolResult);
void DownloadVerData(u_char *templateBuffer);
```

```
void ClearIRQReg(void);
void SetIRQMask(void);
void SWReset(void);
void SetUpLineSensorStartUp(int detect, int drivc, int adcref);
void SetUpLineSensor(void);
void ResetLineSensor(void);
void SetUpLineSensorDETECT(int value);
void SetUpLineSensorDRIVC(int value);
void SetUpLineSensorADCREF(int value);
void PollIRQReg(unsigned char irq);

#endif
```

FPC2010BIOMAIN.H

```
//------------------------------------------------------------
//     Copyright (C) 2003 Fingerprint Cards AB.  All Rights Reserved
//------------------------------------------------------------
//
// The information contained herein is confidential property of
// Fingerprint Cards AB. The use, copying, transfer or disclosure of such
// information is prohibited exceptby express written agreement with
// Fingerprint Cards AB.
//
//------------------------------------------------------------
// File: fpc2010.h
//
// Description:         Biometric functions for the FPC2010 ASIC
//
// Hardware platform:
//
//------------------------------------------------------------
```

```
#ifndef __FPC2010__H
#define __FPC2010__H
```

```
/**
 * Functions
 */
void fpc2010On(void);
void fpc2010Off(void);
void fpc2010Init(void);
bool fpc2010Enrol(u_char *templateBuffer);
bool fpc2010Verify(u_char *templateBuffer);
void fpc2010LoadParameterFile(unsigned char *parameters);

#endif /* FPC2010 */
```

ENCAPSULATED_ALG.H

```
//------------------------------------------------
//    Copyright (C) 2003 Fingerprint Cards AB.  All Rights Reserved
//------------------------------------------------
//
// The information contained herein is confidential property of
// Fingerprint Cards AB. The use, copying, transfer or disclosure of such
// information is prohibited exceptby express written agreement with
// Fingerprint Cards AB.
//
//------------------------------------------------
// File: encapsulated_alg.h
//
// Description:        Encapsulated algorithm interface.
//
```

```
// Hardware: Swipe sensor.
//
//----------------------------------------------
#ifndef __FPC2010HOST_ALG__H
define __FPC2010HOST_ALG__H define PARAMETER_FILE_LENGTH 72 // Length of the fpc2010 parameters in bytes.
// These defines are used as arguments to the function get_fpc2010parameters().
#define ENROL_PARAMETERS     0 // Get enrol parameters.
#define VERIFY_PARAMETERS    1 // Get verify parameters.

//Typedefs used for fpc2010host_alg
typedef short int        XHost_Int16;
typedef int              XHost_Int32;
typedef unsigned char    XHost_UChar8;
typedef signed char      XHost_Char8;
typedef unsigned char    XHost_Bool;

XHost_Bool Create_Template(XHost_UChar8 *InputArray,
        XHost_UChar8 *TemplateBuffer,
        XHost_UChar8 PointOffset,
        XHost_Int16  SwipeLength);

XHost_Bool Match_Data(XHost_UChar8 *VerResultArray,
        XHost_UChar8 *TemplateBuffer,
            XHost_Int16  PointOffset,
        XHost_Int16  SwipeLength);

XHost_Bool PreVerify(XHost_UChar8 *template_buffer, XHost_UChar8 *FPC2010_ver_data);
```

XHost_UChar8 *get_fpc2010_parameters(XHost_UChar8 parameters_to_get);

endif

DISPLAY.H

/* Display library functions */ ifndef __DISPLAY_H
define __DISPLAY_H extern void itoa(int, char []);
extern void write(char *);
extern void display_init(void);
extern void display_test(void);

define WRITE_DELAY 25000 endif

BPG.H

/*
 * include/hardware.h
 *
 */
ifndef __BPG_H
define __BPG_H include "7092.h"

```c
/* These must be defined through the compiler */
/* #define __EVALUALTION_BOARD 1 */
/* #define __RUN_WITH_EMULATOR 1 */
/* #define __PICARD_BOARD_TEST 0 */

/*
 * Bus Controller setup for Hynix HMS39C7092 Microcontroller
 */
#define BCR0_PATTERN    0x102  // 8 bit bus width, 3 wait states
define BCR1_PATTERN    0x100  // 8 bit bus width, 1 wait state /*
 * Port map for Hynix HMS39C7092 Microcontroller
 */

// Pin Mux settings
#define PAMR_PATTERN    0x3fff // PA0: GPIO - Power_NBATTLO
                       // PA1: GPIO - Power_STAT
                       // PA2: GPIO - Power_NCHAG
                       // PA3: GPIO - not used
                       // PA4: GPIO - not used (DISP_DATASEG - eval)
                       // PA5: GPIO - not used (DISP_NWRSEG  - eval)
                       // PA6: GPIO - not used (DISP_NRDSEG  - eval)
                       // PA7: GPIO - not used (DISP_NCSSEG  - eval)

#define PBMR_PATTERN    0x0ff  // PB0: GPIO - not used
                       // PB1: GPIO - not used
                       // PB2: GPIO - not used
                       // PB3: GPIO - not used
                       // PB4: TMS
                       // PB5: TDO
                       // PB6: TDI
```

```
                    // PB7: TCK
#define P1MR_PATTERN    0x00  // P10: address bit 0
                    // P11: address bit 1
                    // P12: address bit 2
                    // P13: address bit 3
                    // P14: address bit 4
                    // P15: address bit 5
                    // P16: address bit 6
                    // P17: address bit 7
#define P2MR_PATTERN    0x00  // P20: address bit 8
                    // P21: address bit 9
                    // P22: address bit 10
                    // P23: address bit 11
                    // P24: address bit 12
                    // P25: address bit 13
                    // P26: address bit 14
                    // P27: address bit 15 - not used
#define P3MR_PATTERN    0xff  // P30: GPIO - not used
                    // P31: GPIO - not used
                    // P32: GPIO - not used
                    // P33: GPIO - not used
                    // P34: GPIO - not used
                    // P35: GPIO - not used
                    // P36: GPIO - not used
                    // P37: GPIO - not used
#define P4MR_PATTERN    0x00  // databus[7:0]

#ifdef __EVALUALTION_BOARD
#define P5MR_PATTERN    0x00  // P50: address bit 16
                    // P51: address bit 17
                    // P52: address bit 18
                    // P53: address bit 19
#else
```

```
#define P5MR_PATTERN    0x0f  // P50: GPIO - DISP_DATASEG
                              // P51: GPIO - DISP_NWRSEG
                              // P52: GPIO - DISP_NRDSEG
                              // P53: GPIO - DISP_NCSSEG
endif define P6MR_PATTERN    0x01b  // P60: GPIO - not used
                               // P61: GPIO - not used
                               // P62: GPIO - not used
                               // P63: nAS - bus interface address strobe
                               // P64: nRD - bus interface read
                               // P65: nHWR - not used
                               // P66: nLWR - bus interface write lower
                               // P67: BCLK - bus interface clock - default io-pin
define FPC2010_CLOCK_MUX_MASK 0x20 define P7MR_PATTERN    0x1ff  // P70: GPIO - not used
                               // P71: GPIO - not used
                               // P72: GPIO - not used
                               // P73: GPIO - not used
                               // P74: GPIO - not used
                               // P75: GPIO - not used
                               // P76: GPIO - not used
                               // P77: GPIO - not used
#define P8MR_PATTERN    0x0b   // P80: IRQ0 - SIRQ
                               // P81: IRQ1 - NIRQ
                               // P82: IRQ2 - NIRQSEG
                               // P83: nCS1 - Exteranl ram chip select
                               // P84: nCS0 - FPC2010 chip select via OR-gate
#define P9MR_PATTERN    0x154  // P90: TxD0,
                               // P91: RxD0
                               // P92: GPIO - FPC2010_IFSEL
                               // P93: GPIO - FPC2010_RESET
```

// P94: GPIO - not used
// P95: GPIO - not used
// P96: Does not exist
// P97: nTRST - JTAG reset // Port A
ifdef __EVALUALTION_BOARD
define PADDR_PATTERN          0x00  // all outputs if enabled by pin mux
define PADR_PATTERN    0x0f  // set PA0-PA3 to 0 and PA4-PA7 to 1
else
define PADDR_PATTERN          0x07  // bit 0, 1 and 2 are inputs, all others are outputs if enabled by pin mux
define PADR_PATTERN    0x00  // all set to 0
endif define POWER_NBATTLO_MASK  0x01
define POWER_STAT_MASK     0x02
define POWER_NCHAG_MASK    0x04 ifdef __EVALUALTION_BOARD
define DISP_NCSSEG_MASK   0x10
define DISP_NRDSEG_MASK   0x20
define DISP_NWRSEG_MASK   0x40
define DISP_DATASEG_MASK  0x80
endif // Port B
define PBDDR_PATTERN          0x00  // all outputs if enabled by pin mux
define PBDR_PATTERN    0x00  // all set to 0

// Port 1

```
#define P1DDR_PATTERN            0x00  // all inputs if enabled by pin mux
#define P1DR_PATTERN    0x00  // all set to 0

// Port 2
#define P2DDR_PATTERN            0x00  // all outputs if enabled by pin mux
#define P2DR_PATTERN    0x00  // all set to 0

// Port 3
#define P3DDR_PATTERN            0x00  // all outputs if enabled by pin mux
#define P3DR_PATTERN    0x00  // all set to 0

// Port 4
#define P4DDR_PATTERN            0x00  // all outputs if enabled by pin mux
#define P4DR_PATTERN    0x00  // all set to 0

// Port 5
#define P5DDR_PATTERN            0x0   // all outputs if enabled by pin mux
define P5DR_PATTERN    0xf   // all set to 1 ifndef __EVALUALTION_BOARD
define DISP_DATASEG_MASK   0x01
#define DISP_NWRSEG_MASK    0x02
#define DISP_NRDSEG_MASK    0x04
#define DISP_NCSSEG_MASK    0x08
endif // Port 6
define P6DDR_PATTERN            0x00  // all outputs if enabled by pin mux
#define P6DR_PATTERN    0x00  // all set to 0
#define FPC2010_CLOCK_MASK 0x80  //

// Port 7
#define P7DDR_PATTERN            0x00  // all outputs
```

```
#define P7DR_PATTERN    0x00  // all set to 0
#define EVAL_LED_MASK   0x20  // evaluation board : P75 controls LED D1

// Port 8
#define P8DDR_PATTERN       0x07  // bit 3 and 4 are outputs, all other are inputs if enabled by pin mux
#define P8DR_PATTERN    0x00  // all set to 0
#define FPC1030_SIRQ_MASK  0x01
#define FPC2010_NIRQ_MASK  0x02
#define DISP_NIRQSEG_MASK  0x04

// Port 9
#define P9DDR_PATTERN       0x00  // all outputs
#define P9DR_PATTERN    0x00  // all outputs set to 0
#define P90_MASK        0x01
#define P91_MASK        0x02
#define FPC2010_IFSEL_MASK  0x04  // 0: EBI, 1: Uart
#define FPC2010_RESET_MASK  0x08

//Display
define DISP_RAM_SIZE 8    // Size of display register bank to use ifdef __EVALUALTION_BOARD
define DISP_DR PADR
#else
#define DISP_DR P5DR
endif //Display Commands
define DISP_SYS_DIS  0x001 // 0b100000000000 inverted to 0b000000000001
#define DISP_SYS_EN   0x401 // 0b100000000010 inverted to 0b010000000001
#define DISP_LCD_OFF  0x201 // 0b100000000100 inverted to 0b001000000001
#define DISP_LCD_ON   0x601 // 0b100000000110 inverted to 0b011000000001
```

```
#define DISP_BIAS_COM 0x4a1 // 0b100001010010 inverted to 0b010010100001

//Timers
#define TIMER0_CONTROL    0x98  // default value
#define TIMER0_IO_CONTROL 0x88  // default value
#define TIMER0_INT_CONTROL 0xf8 // default value, all interrupts disabled
define TIMER0_COUNTER    0x0000 // default value, inital counter register value define TIMER0_MASK       0x01  // Used to start and stop timer0

//Finger print base address
define FPC_BASE (CS0_base+0x30000) // The flash is remap to address 0 - 0x2ffff endif
```

7092.H

```
#ifndef __7092_H
define __7092_H define     SYSTEM_CLOCK              33000000

//----------------------------------------------
// constants
//----------------------------------------------
#define     Mode_Bits         0x1F
#define     Mode_FIQ          0x11
#define     Mode_IRQ          0x12
#define     Mode_SVC          0x13
#define     Mode_USR          0x10
```

```
#define    I_Bit               0x80
define    F_Bit               0x40 define    SM                              0

//----------------------------------------------------
// MCU Base Address Map
//----------------------------------------------------
// 0x09001000 - 0x09001FFF Peripherals (APB bridge)
// 0x09001800 - 0x09001FFF Reserved
// 0x09001900 - 0x090019FF ADC register
// 0x09001800 - 0x090018FF ADC register
// 0x09001600 - 0x090017FF PIO register
// 0x09001600 - 0x090016FF SSI register
// 0x09001500 - 0x090015FF UART1 register
// 0x09001400 - 0x090014FF UART0 register
// 0x09001300 - 0x090013FF TIMER register
// 0x09001200 - 0x090012FF INTC register
// 0x09001100 - 0x090011FF WDT register
// 0x09001000 - 0x090010FF PMU register
// 0x09000000 - 0x09000FFF ASB Register
// 0x09000400 - 0x09000FFF Reserved
// 0x09000300 - 0x090003FF ARM7TDMI Test register
// 0x09000200 - 0x090002FF FMI register
// 0x09000100 - 0x090001FF SMI register
// 0x09000000 - 0x090000FF MCUC register
// 0x08050000 - 0x08FFFFFF Reserved
// 0x08040000 - 0x0804FFFF On-Chip Boot ROM
// 0x08030000 - 0x0803FFFF On-Chip SRAM(4KB)
// 0x08000000 - 0x0802FFFF FLASH(192KB)
// 0x00000000 - 0x07FFFFFF Static Memory Area
//
// MODE0,1,2,3 (SM=0)
```

```
// 0x07000000 - 0x07FFFFFF nCS7
// 0x06000000 - 0x06FFFFFF nCS6
// 0x05000000 - 0x05FFFFFF nCS5
// 0x04000000 - 0x04FFFFFF nCS4
// 0x03000000 - 0x03FFFFFF nCS3
// 0x02000000 - 0x02FFFFFF nCS2
// 0x01000000 - 0x01FFFFFF nCS1
// 0x00000000 - 0x00FFFFFF nCS0 (Remap=0)
// 0x00000000 - 0x00000FFF On-Chip SRAM(4KB) (Remap=1)
//
// MODE0,1,2,3 (SM=1)
// 0x00700000 - 0x007FFFFF nCS7
// 0x00600000 - 0x006FFFFF nCS6
// 0x00500000 - 0x005FFFFF nCS5
// 0x00400000 - 0x004FFFFF nCS4
// 0x00300000 - 0x003FFFFF nCS3
// 0x00200000 - 0x002FFFFF nCS2
// 0x00100000 - 0x001FFFFF nCS1
// 0x00000000 - 0x000FFFFF nCS0 (Remap=0)
// 0x00000000 - 0x00000FFF On Chip SRAM(4KB) (Remap=1)
//
// MODE4,5 (SM=0)
// 0x07000000 - 0x07FFFFFF nCS7
// 0x06000000 - 0x06FFFFFF nCS6
// 0x05000000 - 0x05FFFFFF nCS5
// 0x04000000 - 0x04FFFFFF nCS4
// 0x03000000 - 0x03FFFFFF nCS3
// 0x02000000 - 0x02FFFFFF nCS2
// 0x01000000 - 0x01FFFFFF nCS1
// 0x00000000 - 0x00FFFFFF nCS0 (Remap=0)
// 0x00000000 - 0x0002FFFF FLASH(192KB)
// 0x00000000 - 0x00000FFF On Chip SRAM(4KB) (Remap=1)
//
```

```
// MODE4,5 (SM=1)
// 0x00700000 - 0x007FFFFF nCS7
// 0x00600000 - 0x006FFFFF nCS6
// 0x00500000 - 0x005FFFFF nCS5
// 0x00400000 - 0x004FFFFF nCS4
// 0x00300000 - 0x003FFFFF nCS3
// 0x00200000 - 0x002FFFFF nCS2
// 0x00100000 - 0x001FFFFF nCS1
// 0x00000000 - 0x000FFFFF nCS0 (Remap=0)
// 0x00000000 - 0x0002FFFF FLAH(192KB)
// 0x00000000 - 0x00000FFF On-Chip SRAM(4KB) (Remap=1)
//
// MODE6,7 (SM=0)
// 0x07000000 - 0x07FFFFFF nCS7
// 0x06000000 - 0x06FFFFFF nCS6
// 0x05000000 - 0x05FFFFFF nCS5
// 0x04000000 - 0x04FFFFFF nCS4
// 0x03000000 - 0x03FFFFFF nCS3
// 0x02000000 - 0x02FFFFFF nCS2
// 0x01000000 - 0x01FFFFFF nCS1
// 0x00000000 - 0x00FFFFFF nCS0 (Remap=0)
// 0x00000000 - 0x000000FF On-Chip Boot ROM(256Byte) (default)
// 0x00000000 - 0x0002FFFF FLASH(192KB)(FLASH=1)
// 0x00000000 - 0x00000FFF On-Chip SRAM(4KB) (Remap=1)
//
// MODE6,7 (SM=1)
// 0x00700000 - 0x007FFFFF nCS7
// 0x00600000 - 0x006FFFFF nCS6
// 0x00500000 - 0x005FFFFF nCS5
// 0x00400000 - 0x004FFFFF nCS4
// 0x00300000 - 0x003FFFFF nCS3
// 0x00200000 - 0x002FFFFF nCS2
// 0x00100000 - 0x001FFFFF nCS1
```

```
// 0x00000000 - 0x000FFFFF nCS0 (Remap=0)
// 0x00000000 - 0x000000FF On-Chip Boot ROM(256Byte) (default)
// 0x00001000 - 0x0002FFFF FLAH(192KB) (FLASH=1)
// 0x00000000 - 0x00000FFF On-Chip SRAM(4KB) (Remap=1)
// define    ADC_base      0x09001700
define    GPIO_base     0x09001600
#define    UART1_base    0x09001500
#define    UART0_base    0x09001400
#define    TIMER_base    0x09001300
#define    INTC_base     0x09001200
#define    WDT_base      0x09001100
#define    PMU_base      0x09001000
#define    PERI_base     0x09001000
#define    ARM_test      0x09000300
#define    FMI_ctrl      0x09000200
#define    BUS_ctrl      0x09000100
#define    MCU_ctrl      0x09000000
#define    BOOTROM_base  0x08040000
#define    ISRAM_base    0x08030000
#define    FLASH_base    0x08000000
define    EXCS_base     0x00000000 if SM == 0
//------------------------------------------------
// Static Memory Interface Map(16M)    (0x00000000 - 0x07FFFFFF)
//  SM=0
//------------------------------------------------
#define    CS7_base      0x07000000
#define    CS6_base      0x06000000
#define    CS5_base      0x05000000
#define    CS4_base      0x04000000
```

```
#define    CS3_base    0x03000000
#define    CS2_base    0x02000000
#define    CS1_base    0x01000000
#define    CS0_base    0x00000000
#else
//---------------------------------------------
// Static Memory Interface Map(1M)    (0x00000000 - 0x007FFFFF)
// SM=1
//---------------------------------------------
#define    CS7_base    0x00700000
#define    CS6_base    0x00600000
#define    CS5_base    0x00500000
#define    CS4_base    0x00400000
#define    CS3_base    0x00300000
#define    CS2_base    0x00200000
#define    CS1_base    0x00100000
#define    CS0_base    0x00000000
endif //---------------------------------------------
// ASB Register Memory Map    (0x09000000 - 0x09000FFF)
//---------------------------------------------
//---------------------------------------------
// MCU control Map    (0x09000000 - 0x090000FF)
//---------------------------------------------
#define    PAMR    ((volatile unsigned int*)(MCU_ctrl+0x00))
#define    PBMR    ((volatile unsigned int*)(MCU_ctrl+0x04))
#define    P1MR    ((volatile unsigned int*)(MCU_ctrl+0x08))
#define    P2MR    ((volatile unsigned int*)(MCU_ctrl+0x0C))
#define    P3MR    ((volatile unsigned int*)(MCU_ctrl+0x10))
#define    P4MR    ((volatile unsigned int*)(MCU_ctrl+0x14))
#define    P5MR    ((volatile unsigned int*)(MCU_ctrl+0x18))
#define    P6MR    ((volatile unsigned int*)(MCU_ctrl+0x1C))
```

```
#define    P7MR                    ((volatile unsigned int*)(MCU_ctrl+0x20))
#define    P8MR                    ((volatile unsigned int*)(MCU_ctrl+0x24))
#define    P9MR                    ((volatile unsigned int*)(MCU_ctrl+0x28))
#define    DCR                     ((volatile unsigned int*)(MCU_ctrl+0x2C))
```

```
//----------------------------------------
// SMI Register Map      (0x09000100 - 0x090001FF)
//----------------------------------------
// 31  30  29  28  27  26   24   23   22-20   19-16
// 15  14  13  12  11  10   8    7    6-4     3-0
//     RDON CSCNTL Falsh ExpCLK MemWidth BurstEn BurstWait NorWait
// lcd CSON                    LCD Wait (21-16)
//     CSON
#define    BCR0                    ((volatile unsigned int*)(BUS_ctrl+0x00))
#define    BCR1                    ((volatile unsigned int*)(BUS_ctrl+0x04))
#define    BCR2                    ((volatile unsigned int*)(BUS_ctrl+0x08))
#define    BCR3                    ((volatile unsigned int*)(BUS_ctrl+0x0C))
#define    BCR4                    ((volatile unsigned int*)(BUS_ctrl+0x10))
#define    BCR5                    ((volatile unsigned int*)(BUS_ctrl+0x14))
#define    BCR6                    ((volatile unsigned int*)(BUS_ctrl+0x18))
#define    BCR7                    ((volatile unsigned int*)(BUS_ctrl+0x1C))
```

```
//----------------------------------------
// FMI Register Map      (0x09000200 - 0x090002FF)
//----------------------------------------
// FSTATPWRR {HVEEI, LVEEI, LVCC_RST, VEEIOPT[1:0], VPPDOPT[1:0], VPPIOPT[1:0]}
//            S    S   S         P            P             P
// S : status(Read only) ; P : Power option register(Read/Write)
#define    FMWR                    ((volatile unsigned int*)(FMI_ctrl+0x00))  // R/W  : Bus wait control register
#define    FMAR                    ((volatile unsigned int*)(FMI_ctrl+0x04))  // WRITE : ADDRR, DATAR address, READ : ADDRR
```

```c
#define    FMDR          ((volatile unsigned int*)(FMI_ctrl+0x08))    // READ : DATAR(read only register)
#define    FMCR          ((volatile unsigned int*)(FMI_ctrl+0x0C))    // R/W  : flash control register
#define    FEBR          ((volatile unsigned int*)(FMI_ctrl+0x10))    // R/W  : flash erase block register
#define    FMPR          ((volatile unsigned int*)(FMI_ctrl+0x14))    // status power option register.
define    FMTR          ((volatile unsigned int*)(FMI_ctrl+0x18))    // R/W  : flash test register //------------------------------------------------
// Peripherals (APB bridge) Map   (0x09001000 - 0x09001FFF)
//------------------------------------------------
//------------------------------------------------
// PMU Map                        (0x09001000 - 0x090010FF)
//------------------------------------------------
#define    PMUST         ((volatile unsigned int*)(PMU_base+0x00))
           // PMU operation mode control register
#define    PMUCR         ((volatile unsigned int*)(PMU_base+0x00))
           // PMU operation mode control register
#define    MEMCR         ((volatile unsigned int*)(PMU_base+0x10))
           // Remap Control Register
#define    RSTCR         ((volatile unsigned int*)(PMU_base+0x30))
           // Soft Reset Control Register
#define    PCKCR         ((volatile unsigned int*)(PMU_base+0x08))
           // PCLK control register //------------------------------------------------
// Watch-Dog Timer (WDT) Map       (0x09001100 - 0x090011FF)
//------------------------------------------------
#define    WTCR          ((volatile unsigned int*)(WDT_base+0x00))
           // Timer/Reset Control Register(R/W)
```

```
#define    WTSR                              ((volatile unsigned int*)(WDT_base+0x04))
           // Reset Status Register(R)
#define    WTCNT                             ((volatile unsigned int*)(WDT_base+0x08))
           // Timer Counter Register(R/W)

//--------------------------------------------------
// Intrrupt Controller (INTC) Map    (0x09001200 - 0x090012FF)
//--------------------------------------------------
#define    GMR                               ((volatile unsigned int*)(INTC_base+0x00))
           // Global Mask Register
#define    TMR                               ((volatile unsigned int*)(INTC_base+0x04))
           // Trigger Mode Register
#define    TPR                               ((volatile unsigned int*)(INTC_base+0x08))
           // Trigger Polarity Register
#define    IDR                               ((volatile unsigned int*)(INTC_base+0x0C))
           // Interrupt Direction Register
#define    FSR                               ((volatile unsigned int*)(INTC_base+0x10))
           // FIQ Status Register
#define    ISR                               ((volatile unsigned int*)(INTC_base+0x14))
           // IRQ Status Register
#define    FMR                               ((volatile unsigned int*)(INTC_base+0x18))
           // FIQ Mask Register
#define    IMR                               ((volatile unsigned int*)(INTC_base+0x1C))
           // IRQ Mask Register
#define    ISCR                              ((volatile unsigned int*)(INTC_base+0x20))
           // Status Clear Register define    IB_IRQ0        0x00001
define    IB_IRQ1        0x00002
#define    IB_IRQ2        0x00004
#define    IB_IRQ3        0x00008
#define    IB_IRQ4        0x00010
#define    IB_IRQ5        0x00020
```

```
#define    IB_IRQ6                 0x00040
#define    IB_IRQ7                 0x00080
#define    IB_COMTX   0x00100
#define    IB_COMRX   0x00200
#define    IB_WDT                  0x00400
#define    IB_UART0   0x00800
#define    IB_UART1   0x01000
#define    IB_ADC                  0x02000
#define    IB_TIMER0  0x04000
#define    IB_TIMER1  0x08000
#define    IB_TIMER2  0x10000
#define    IB_TIMER3  0x20000
#define    IB_TIMER4  0x40000
#define    IB_TIMER5  0x80000
define    IB_SWI                  0x100000 define    IB_EXIRQ    0x0000ff
define    IB_TIMER_ALL            0x0fc0 define    ID_IRQ0                 0x00
define    ID_IRQ1                 0x01
#define    ID_IRQ2                 0x02
#define    ID_IRQ3                 0x03
#define    ID_IRQ4                 0x04
#define    ID_IRQ5                 0x05
#define    ID_IRQ6                 0x06
#define    ID_IRQ7                 0x07
#define    ID_COMTX   0x08
#define    ID_COMRX   0x09
#define    ID_WDT                  0x0A
#define    ID_UART0                0x0B
#define    ID_UART1                0x0C
#define    ID_ADC                  0x0D
```

```
#define     ID_TIMER0   0x0E
#define     ID_TIMER1   0x0F
#define     ID_TIMER2   0x10
#define     ID_TIMER3   0x11
#define     ID_TIMER4   0x12
#define     ID_TIMER5   0x13
#define     ID_SWI              0x14
```

```
//------------------------------------------
// TIMER Register Map                    (0xFFFFF000 - 0xFFFFFFFF)
//------------------------------------------
//==========================================
// [ Timer register description ]
//==========================================
// TSTARTR : Timer start register
// TSYNCR  : Timer sync register
// TPWMR   : Timer PWM register
//------------------------------------------
// Timer control register
// TCRx : [7],[4:3] : reserved (init vaule all 1)
//        [6:5]    : 00 ->free running
//                   01 ->clear by GRA commat,TPA input capture
//                   10 ->clear by GRB commat,TPB input capture
//                   11 ->cleared by other sync timer
//        [2:0]    : 000->int_clk1(BCLK/2),001->int_clk2(/4)
//                   010->int_clk3(/8),  011->int_clk4(/16)
//                   100->ext_clk1,    101->ext_clk2
//                   110->ext_clk3,    111->ext_clk4
//------------------------------------------
// I/O control register
// TIOCRx : [7],[3] : reserved (init vaule all 1)
//        [6:4]    : 000->pin output disable at commat
//                   001->0 GRB match,010->1 GRB match
```

```
//                     011->toggle GRB match
//                     100->GRB capture at rising
//                     101->GRB capture at falling
//                     110->GRB capture at both egde
//         [2:0]     : Same as [6:4], for GRA
//---------------------------------------------------
// Timer interrupt enable register
// TIERx  : [7:3]    : reserved (init vaule all 1)
//          [2]      : interrupt from OVFI(1:enable,0:disable)
//          [1]      : interrupt from MCIB(1:enable,0:disable),GRB
//          [0]      : interrupt from MCIA(1:enable,0:disable),GRA
//---------------------------------------------------
// Timer status register
// TSRx: [7:3]       : reserved (init vaule all 1)
//        [2]        : OVFI status
//        [1]        : MCIB status
//        [0]        : MCIA status
//---------------------------------------------------
// TCOUNTx : Timer count (16bit)
// GRAx,GRBx: General register (16bit)
//---------------------------------------------------
#define   TSTARTR        ((volatile unsigned int*)(TIMER_base+0x00))
          // Timer Start Register
#define   TSYNCR         ((volatile unsigned int*)(TIMER_base+0x04))
          // Timer Synch Register
#define   TPWMR          ((volatile unsigned int*)(TIMER_base+0x08))
          // Timer PWM mode Register define   TCR0           ((volatile unsigned int*)(TIMER_base+0x20))
          // Timer Control Register
#define   TIOCR0         ((volatile unsigned int*)(TIMER_base+0x24))
          // Timer I/O Control Register
```

```
#define   TIER0                              ((volatile unsigned int*)(TIMER_base+0x28))
          // Timer Interrupt Enable Register
#define   TSR0                               ((volatile unsigned int*)(TIMER_base+0x2C))
          // Timer Status Register
#define   TCNT0                              ((volatile unsigned int*)(TIMER_base+0x30))
          // Timer Counter
#define   GRA0                               ((volatile unsigned int*)(TIMER_base+0x34))
          // General Register A
#define   GRB0                               ((volatile unsigned int*)(TIMER_base+0x38))
          // General Register B define   TCR1                               ((volatile unsigned int*)(TIMER_base+0x40))
          // Timer Control Register
#define   TIOCR1                             ((volatile unsigned int*)(TIMER_base+0x44))
          // Timer I/O Control Register
#define   TIER1                              ((volatile unsigned int*)(TIMER_base+0x48))
          // Timer Interrupt Enable Register
#define   TSR1                               ((volatile unsigned int*)(TIMER_base+0x4C))
          // Timer Status Register
#define   TCNT1                              ((volatile unsigned int*)(TIMER_base+0x50))
          // Timer Counter
#define   GRA1                               ((volatile unsigned int*)(TIMER_base+0x54))
          // General Register A
#define   GRB1                               ((volatile unsigned int*)(TIMER_base+0x58))
          // General Register B define   TCR2                               ((volatile unsigned int*)(TIMER_base+0x60))
          // Timer Control Register
#define   TIOCR2                             ((volatile unsigned int*)(TIMER_base+0x64))
          // Timer I/O Control Register
#define   TIER2                              ((volatile unsigned int*)(TIMER_base+0x68))
          // Timer Interrupt Enable Register
```

```c
#define   TSR2      ((volatile unsigned int*)(TIMER_base+0x6C))
          // Timer Status Register
#define   TCNT2     ((volatile unsigned int*)(TIMER_base+0x70))
          // Timer Counter
#define   GRA2      ((volatile unsigned int*)(TIMER_base+0x74))
          // General Register A
#define   GRB2      ((volatile unsigned int*)(TIMER_base+0x78))
          // General Register B define   TCR3      ((volatile unsigned int*)(TIMER_base+0x80))
          // Timer Control Register
#define   TIOCR3    ((volatile unsigned int*)(TIMER_base+0x84))
          // Timer I/O Control Register
#define   TIER3     ((volatile unsigned int*)(TIMER_base+0x88))
          // Timer Interrupt Enable Register
#define   TSR3      ((volatile unsigned int*)(TIMER_base+0x8C))
          // Timer Status Register
#define   TCNT3     ((volatile unsigned int*)(TIMER_base+0x90))
          // Timer Counter
#define   GRA3      ((volatile unsigned int*)(TIMER_base+0x94))
          // General Register A
#define   GRB3      ((volatile unsigned int*)(TIMER_base+0x98))
          // General Register B define   TCR4      ((volatile unsigned int*)(TIMER_base+0xA0))
          // Timer Control Register
#define   TIOCR4    ((volatile unsigned int*)(TIMER_base+0xA4))
          // Timer I/O Control Register
#define   TIER4     ((volatile unsigned int*)(TIMER_base+0xA8))
          // Timer Interrupt Enable Register
#define   TSR4      ((volatile unsigned int*)(TIMER_base+0xAC))
          // Timer Status Register
```

```
#define    TCNT4                          ((volatile unsigned int*)(TIMER_base+0xB0))
           // Timer Counter
#define    GRA4                           ((volatile unsigned int*)(TIMER_base+0xB4))
           // General Register A
#define    GRB4                           ((volatile unsigned int*)(TIMER_base+0xB8))
           // General Register B define    TCR5                           ((volatile unsigned int*)(TIMER_base+0xD0))
           // Timer Control Register
#define    TIOCR5                         ((volatile unsigned int*)(TIMER_base+0xD4))
           // Timer I/O Control Register
#define    TIER5                          ((volatile unsigned int*)(TIMER_base+0xD8))
           // Timer Interrupt Enable Register
#define    TSR5                           ((volatile unsigned int*)(TIMER_base+0xDC))
           // Timer Status Register
#define    TCNT5                          ((volatile unsigned int*)(TIMER_base+0xE0))
           // Timer Counter
#define    GRA5                           ((volatile unsigned int*)(TIMER_base+0xE4))
           // General Register A
#define    GRB5                           ((volatile unsigned int*)(TIMER_base+0xE8))
           // General Register B //-------------------------------------------------
// UART Register Map                    (0x09001400 - 0x090015FF)
//-------------------------------------------------
#define    RBR                            0x00
#define    THR                            0x00
#define    DLL                            0x00       // Receiver Buffer Reg. (R DLAB = 0)
                                                     // Transmitter Holding Reg. (W DLAB = 0)
                                                     // Divisor Latch LS (R/W DLAB = 1)
```

```
#define    IER           0x04
#define    DLM           0x04        // Interrupt Enable Reg. (R/W
DLAB = 0)
                                     // Divisor Latch MS (R/W DLAB = 1)
#define    IIR           0x08
#define    FCR           0x08        // Interrupt Ident Reg. (R)
                                     // Divisor Latch MS (R/W DLAB = 1)
#define    LCR           0x0c        // Line Control Reg. (R/W)
#define    LSR           0x14        // Line Status Reg. (R/W)
#define    SCR           0x1C        // Scratch Reg.
#define    CLKCR         0x20        // CLK generation Control Reg.
#define    CLKDR         0x24        // CLK divisor Reg.

#define    LSR_DR        0x01
#define    LSR_THRE      0x20
#define    LSR_TEMPT     0x40
#define    IER_TIE       0x02
#define    IER_RIE       0x01

//------------------------------------------------
// UART0 Register Map              (0x09001400 - 0x090014FF)
//------------------------------------------------
#define    U0RBR         ((volatile unsigned int*)(UART0_base+RBR))
#define    U0THR         ((volatile unsigned int*)(UART0_base+THR))
#define    U0DLL         ((volatile unsigned int*)(UART0_base+DLL))
#define    U0IER         ((volatile unsigned int*)(UART0_base+IER))
#define    U0DLM         ((volatile unsigned int*)(UART0_base+DLM))
#define    U0IIR         ((volatile unsigned int*)(UART0_base+IIR))
#define    U0FCR         ((volatile unsigned int*)(UART0_base+FCR))
#define    U0LCR         ((volatile unsigned int*)(UART0_base+LCR))
#define    U0MCR         ((volatile unsigned int*)(UART0_base+MCR))
#define    U0LSR         ((volatile unsigned int*)(UART0_base+LSR))
#define    U0MSR         ((volatile unsigned int*)(UART0_base+MSR))
```

```
#define    U0SCR                  ((volatile unsigned int*)(UART0_base+SCR))
#define    U0Enable               ((volatile unsigned int*)(UART0_base+CLKCR))
#define    U0Prescale             ((volatile unsigned int*)(UART0_base+CLKDR))
```

```
//--------------------------------------------------
// UART1 Register Map           (00x09001500 - 0x090015FF)
//--------------------------------------------------
#define    U1RBR                  ((volatile unsigned int*)(UART1_base+RBR))
#define    U1THR                  ((volatile unsigned int*)(UART1_base+THR))
#define    U1DLL                  ((volatile unsigned int*)(UART1_base+DLL))
#define    U1IER                  ((volatile unsigned int*)(UART1_base+IER))
#define    U1DLM                  ((volatile unsigned int*)(UART1_base+DLM))
#define    U1IIR                  ((volatile unsigned int*)(UART1_base+IIR))
#define    U1FCR                  ((volatile unsigned int*)(UART1_base+FCR))
#define    U1LCR                  ((volatile unsigned int*)(UART1_base+LCR))
#define    U1MCR                  ((volatile unsigned int*)(UART1_base+MCR))
#define    U1LSR                  ((volatile unsigned int*)(UART1_base+LSR))
#define    U1MSR                  ((volatile unsigned int*)(UART1_base+MSR))
#define    U1SCR                  ((volatile unsigned int*)(UART1_base+SCR))
#define    U1Enable               ((volatile unsigned int*)(UART1_base+CLKCR))
#define    U1Prescale             ((volatile unsigned int*)(UART1_base+CLKDR))
```

```
//--------------------------------------------------
// PIO Register Map             (00x09001600 - 0x090016FF)
//--------------------------------------------------
#define    PADR                   ((volatile unsigned int*)(GPIO_base+0x00))
           // PA Data Register
#define    PADDR                  ((volatile unsigned int*)(GPIO_base+0x04))
           // PA Data Direction Register
#define    PBDR                   ((volatile unsigned int*)(GPIO_base+0x08))
           // PB Data Register
#define    PBDDR                  ((volatile unsigned int*)(GPIO_base+0x0C))
           // PB Data Direction Register
```

```c
#define     P1DR      ((volatile unsigned int*)(GPIO_base+0x10))
            // P1 Data Register
#define     P1DDR     ((volatile unsigned int*)(GPIO_base+0x14))
            // P1 Data Direction Register
#define     P2DR      ((volatile unsigned int*)(GPIO_base+0x18))
            // P2 Data Register
#define     P2DDR     ((volatile unsigned int*)(GPIO_base+0x1C))
            // P2 Data Direction Register
#define     P3DR      ((volatile unsigned int*)(GPIO_base+0x20))
            // P3 Data Register
#define     P3DDR     ((volatile unsigned int*)(GPIO_base+0x24))
            // P3 Data Direction Register
#define     P4DR      ((volatile unsigned int*)(GPIO_base+0x28))
            // P4 Data Register
#define     P4DDR     ((volatile unsigned int*)(GPIO_base+0x2c))
            // P4 Data Direction Register
#define     P5DR      ((volatile unsigned int*)(GPIO_base+0x30))
            // P5 Data Register
#define     P5DDR     ((volatile unsigned int*)(GPIO_base+0x34))
            // P5 Data Direction Register
#define     P6DR      ((volatile unsigned int*)(GPIO_base+0x38))
            // P6 Data Register
#define     P6DDR     ((volatile unsigned int*)(GPIO_base+0x3C))
            // P6 Data Direction Register
#define     P7DR      ((volatile unsigned int*)(GPIO_base+0x40))
            // P7 Data Register
#define     P7DDR     ((volatile unsigned int*)(GPIO_base+0x44))
            // P7 Data Direction Register
#define     P8DR      ((volatile unsigned int*)(GPIO_base+0x48))
            // P8 Data Register
#define     P8DDR     ((volatile unsigned int*)(GPIO_base+0x4c))
            // P8 Data Direction Register
```

```
#define    P9DR                        ((volatile unsigned int*)(GPIO_base+0x50))
           // P9 Data Register
#define    P9DDR                       ((volatile unsigned int*)(GPIO_base+0x54))
           // P9 Data Direction Register //--------------------------------------------------
// ADC Register Map                    (00x09001700 - 0x090017FF)
//--------------------------------------------------
#define    ADCSR                       ((volatile unsigned int*)(ADC_base+0x00))
           // ADC Control & Status Register
#define    ADCCR                       ((volatile unsigned int*)(ADC_base+0x04))
           // ADC Control Register
#define    ADDR0                       ((volatile unsigned int*)(ADC_base+0x08))
           // ADC Data Register 0
#define    ADDR1                       ((volatile unsigned int*)(ADC_base+0x0c))
           // ADC Data Register 1
#define    ADDR2                       ((volatile unsigned int*)(ADC_base+0x10))
           // ADC Data Register 2
#define    ADDR3                       ((volatile unsigned int*)(ADC_base+0x14))
           // ADC Data Register 3
#define    ADDR4                       ((volatile unsigned int*)(ADC_base+0x18))
           // ADC Data Register 4 endif
```

UTILITY.C

```
/* Miscellaneous utilities */ include "bpg.h"
include "display.h"

void delay(int count)
```

```
{
/* loop:      __asm { */
/*                    subs r0,r0,#1 */
/*                    bgt loop */
/*            } */ while(count) {
    count = count - 1;
    /*  count--; This construction does not work ? */
  }
} void message(char * s)
{
    write(s);
    delay(2*WRITE_DELAY);
    write("     ");
    delay(WRITE_DELAY);
    write(s);
    delay(2*WRITE_DELAY);
    write("     ");
    delay(WRITE_DELAY);
    write("reAdy");
    delay(2*WRITE_DELAY);
} unsigned int battery_check(void) { unsigned int battery_status;
  unsigned int power_status;

power_status = *PADR & POWER_NCHAG_MASK;
  battery_status = *PADR & POWER_NBATTLO_MASK;
```

```
  if (power_status) {
   if (battery_status) {
    return 0;
   }
   else {
    message("BAtt Lo");
    return 1;
   }
  }
  return 0;
}
```

TIMER.C

```
/* Timer utilities */ include "7092.h"
include "bpg.h"
#include "timer.h"

void timer0_init(void) {

*TCR0 = TIMER0_CONTROL;     // free running mode
  *TIOCR0 =TIMER0_IO_CONTROL; // dont care in free running mode
  *TIER0 = TIMER0_INT_CONTROL; // disable all interrupts
  *TCNT0 = TIMER0_COUNTER;    // clear counter register
}
```

RETARGET.C

```
/*
** Copyright (C) ARM Limited, 2001. All rights reserved.
```

```
*/

/*
** This implements a 'retarget' layer for low-level IO. Typically, this
** would contain your own target-dependent implementations of fputc(),
** ferror(), etc.
**
** This example provides implementations of __user_initial_stackheap().
**
*/ include <stdio.h>
include <rt_misc.h> extern unsigned int bottom_of_heap;

__value_in_regs struct __initial_stackheap __user_initial_stackheap(
    unsigned R0, unsigned SP, unsigned R2, unsigned SL)
{
    struct __initial_stackheap config;

config.heap_base = (unsigned int)&bottom_of_heap;  // defined in heap.s
                                                       // placed by scatterfile
    config.stack_base = SP;   // inherit SP from the execution environment return config;
}

/*
Below is an equivalent example assembler version of __user_initial_stackheap.

It will be entered with the value of the stackpointer in r1 (as set in init.s),
this does not need to be changed and so can be passed unmodified out of the
``` function.

```
    IMPORT bottom_of_heap
    EXPORT __user_initial_stackheap

__user_initial_stackheap
    LDR    r0,=bottom_of_heap
    MOV    pc,lr
*/
```

RANDOM.C

/* linear congruential generator. Generator x[n+1] = a * x[n] mod m */ include "random.h"
include "math.h"

static unsigned int SEED = 93186752;

double random (void)
{
/* The following parameters are recommended settings based on research
   uncomment the one you want. */
    static unsigned int a = 1588635695, m = 4294967291U, q = 2, r = 1117695901;
/* static unsigned int a = 1223106847, m = 4294967291U, q = 3, r = 625646750;*/
/* static unsigned int a = 279470273, m = 4294967291U, q = 15, r = 102913196;*/
/* static unsigned int a = 1583458089, m = 2147483647, q = 1, r = 564025558; */
/* static unsigned int a = 784588716, m = 2147483647, q = 2, r = 578306215; */
/* static unsigned int a = 16807, m = 2147483647, q = 127773, r = 2836;    */
/* static unsigned int a = 950706376, m = 2147483647, q = 2, r = 246070895; */

SEED = a*(SEED % q) - r*(SEED / q);

```
  return ((double)SEED / (double)m);
} void rand_seed (unsigned int init)   {if (init != 0) SEED = init;}

// token
double token(double x) { double v = 100000000000LL;
  double d = 0;
  double g = 0;

x = (tempa*x) + tempc;

while(x>=1000){
    d = x-(10*floor(x/10));
    if(x<v){
      g=(10*g)+d;
      v=v/10;
    }
    x=(x-d)/10;
  } return g;
}
```

PORT.C

/* Display utilities */ include "7092.h"
include "bpg.h"

```
void port_init() {

//Port control
*PADR = PADR_PATTERN;
*PADDR = PADDR_PATTERN;
*PBDR = PBDR_PATTERN;
*PBDDR = PBDDR_PATTERN;
*P1DR = P1DR_PATTERN;
*P1DDR = P1DDR_PATTERN;
*P2DR = P2DR_PATTERN;
*P2DDR = P2DDR_PATTERN;
*P3DR = P3DR_PATTERN;
*P3DDR = P3DDR_PATTERN;
*P4DR = P4DR_PATTERN;
*P4DDR = P4DDR_PATTERN;
*P5DR = P5DR_PATTERN;
*P5DDR = P5DDR_PATTERN;
*P6DR = P6DR_PATTERN;
*P6DDR = P6DDR_PATTERN;
*P7DR = P7DR_PATTERN;
*P7DDR = P7DDR_PATTERN;
*P8DR = P8DR_PATTERN;
*P8DDR = P8DDR_PATTERN;
*P9DR = P9DR_PATTERN;
*P9DDR = P9DDR_PATTERN;

//Mux control
*PAMR = PAMR_PATTERN;
*PBMR = PBMR_PATTERN;
*P1MR = P1MR_PATTERN;
*P2MR = P2MR_PATTERN;
*P3MR = P3MR_PATTERN;
*P4MR = P4MR_PATTERN;
```

```
*P5MR = P5MR_PATTERN;
*P6MR = P6MR_PATTERN;
*P7MR = P7MR_PATTERN;
*P8MR = P8MR_PATTERN;
*P9MR = P9MR_PATTERN;

}
```

MAIN.C

```
/*
 * Smart Card pin code generator with finger print access control
 *
 * Copyright (C) 2001 DELTA IC Design, All Rights Reserved.
 *
 * $Author: lbm $ :
 *
 * $Id: print.asm,v 1.12 2002/11/21 14:29:14 lbm Exp $ :
 *
 */ include "typdefs.h"
include "bpg.h"
#include "utility.h"
#include "port.h"
#include "display.h"
#include "timer.h"
#include "random.h"
#include "fpc2010biomain.h"
#include "fpc2010interface.h"
#include "encapsulated_alg.h"
#include "fpc2010registers.h"
```

```c
unsigned char disp_ram[DISP_RAM_SIZE];
unsigned char template[TEMPLATE_SIZE];

void wait_for_finger_detected() { while(!(*P8DR & FPC1030_SIRQ_MASK)) {
  }
} void test() { char str[9];
  unsigned int tok = 2674834;
  unsigned int rand;
  bool result;

port_init();

timer0_init();
  START_TIMER0;

display_init();
  write("reAdy");
  delay(2*WRITE_DELAY);

ifndef DEBUG ifndef __EVALUALTION_BOARD
  battery_check();
#endif

STOP_TIMER0;
```

```
rand_seed(*TCNT0);
rand = RAND_INT(10000000,99999999);
tok = rand;

fpc2010Init();

wait_for_finger_detected();
result = fpc2010Enrol(template);

if (!result) {
  write("Error");
} else {
  write("Good");
}
delay(2*WRITE_DELAY);
write("yyyyyyyy");
delay(2*WRITE_DELAY);

while(1) { tok = (unsigned int)token((double)tok);
  itoa(tok, str);
  write(str);
  delay(2*WRITE_DELAY);

write("12345678");
  delay(WRITE_DELAY);
  write("reAdy");
  delay(2*WRITE_DELAY);
  write("Good");
  delay(2*WRITE_DELAY);
  write("Good-1");
  delay(2*WRITE_DELAY);
```

```
    write("Good-2");
    delay(2*WRITE_DELAY);
    write("Error");
    delay(2*WRITE_DELAY);
    write("rejected");
    delay(3*WRITE_DELAY);
    write("BAtt Lo");
    delay(3*WRITE_DELAY);

wait_for_finger_detected();
    result = fpc2010Verify(template);
    if (!result) {
      write("rejected");
    } display_test();

ifdef __EVALUALTION_BOARD
    *P7DR = *P7DR ^ EVAL_LED_MASK; // Toggle evaluation board led
endif }
endif
} void picard_application() { char str[9];
  unsigned int tok = 2674834;
  unsigned int rand;
  bool result;

port_init();
```

```
timer0_init();
START_TIMER0;

display_init();
fpc2010Init();

if (!battery_check()) {
  write("reAdy");
  delay(2*WRITE_DELAY);
} error:
// 1st step: create template
battery_check();
wait_for_finger_detected();
result = fpc2010Enrol(template);

if (!result) {
  message("Error");
  goto error;
}
write("Good");
delay(2*WRITE_DELAY);

// 2nd step: verify template the 1st time
battery_check();
wait_for_finger_detected();
result = fpc2010Verify(template);

if (!result) {
  message("Error");
  goto error;
```

```
}
write("Good-1");
delay(2*WRITE_DELAY);

// 3nd step: verify template the 2nd time
battery_check();
wait_for_finger_detected();
result = fpc2010Verify(template);

if (!result) {
  message("Error");
  goto error;
}
write("Good-2");
delay(2*WRITE_DELAY);

// Now we have a useable template

// The first time a finger print can be verified successfully
// a random number is generated.
error_verify:
battery_check();
wait_for_finger_detected();
result = fpc2010Verify(template);
if (!result) {
  message("rejected");
  goto error_verify;
}

// Generate random number using seed from timer
STOP_TIMER0;
rand_seed(*TCNT0);
rand = RAND_INT(10000000,99999999);
```

```
tok = rand;
itoa(tok, str);
write(str);

// Generate random numbers using SMI algorithme
// each time a finger print is recognized
while(1) {
  battery_check();
  wait_for_finger_detected();
  result = fpc2010Verify(template);
  if (!result) {
    message("rejected");
  }
  else {
    tok = (unsigned int)token((double)tok);
    itoa(tok, str);
    write(str);
  }
 }
} int main(void)
{
 *BCR0 = BCR0_PATTERN;

// test();
 picard_application();

}
```

INT_HANDLER.C

```c
/**************************************************************/
/*    File: int_handler.c                          */
/*    Purpose: IRQ interrupt handler code          */
/**************************************************************/ include "7092.h"    /* to use with the Hynix HMS39C7092 */ extern int IntCT1;
extern int IntCT2;

/***************************************************************
 * IRQHandler                                                  *
 *                                                             *
 * This function handles IRQ interrupts. In this example, these may come from *
 * Timer 1 or Timer 2.                                         *
 *                                                             *
 * This handler simply clears the interrupt and sets corresponding flags. *
 * These flags are then checked by the main application.       *
 *                                                             *
 ***************************************************************/
void __irq IRQ_Handler(void)
{
  unsigned status;

status = *ISR;
  /* Deal with source of interrupt */ if (status & IB_TIMER1)
  {
    *ISCR = IB_TIMER1; /* clear the interrupt */
  }
  else if (status & IB_TIMER2)
  {
```

```
        *ISCR = IB_TIMER2; /* clear the interrupt */
    }
}
```

FPC2010INTERFACE.C

```
//------------------------------------------------------------
//    Copyright (C) 2003 Fingerprint Cards AB.  All Rights Reserved
//------------------------------------------------------------
//
// The information contained herein is confidential property of
// Fingerprint Cards AB. The use, copying, transfer or disclosure of such
// information is prohibited exceptby express written agreement with
// Fingerprint Cards AB.
//
//------------------------------------------------------------
// File: fpc2010interface.c
//
// Description:          Interface driver for the FPC2010 ASIC.
//
// Hardware platform: FPC6430
//
//------------------------------------------------------------ include "bpg.h"
include "typdefs.h"
#include "utility.h"

#include "fpc2010biomain.h"
#include "fpc2010interface.h"
#include "fpc2010registers.h"
#include "encapsulated_alg.h"
```

```c
/*******************************************************************
 *
 * Retrieves the content of the Result RAM in FPC2010.
 *
 * @param buffer - Memory area to fill with the Result RAM content.
 *
 *******************************************************************/
void UploadVerResultRAMContent(u_char *buffer)
{
  int current_byte;

*VerResultAddrPointer = 0;

for (current_byte = 0; current_byte < FPC2010_VER_RESULT_RAM_SIZE; current_byte++)
    {
      buffer[current_byte] = *VerResultReadData;
    }
} /* UploadVerResultRAMContent */

/*******************************************************************
 *
 * Loads FPC2010 with data to work with during verification.
 *
 * @param *templateBuffer - Memory area for the template data
 *
 *******************************************************************/
void DownloadVerData(u_char *templateBuffer)
{
  u_char FPC2010_ver_data[FPC2010_WORK_RAM_SIZE];
  int   current_byte;

PreVerify(templateBuffer, FPC2010_ver_data);
```

```c
    *WorkRAMAddrPointer = 0;

for (current_byte = 0; current_byte < FPC2010_WORK_RAM_SIZE; current_byte++)
    {
        *WorkRAMWriteData = FPC2010_ver_data[current_byte];
    }

} /* DownloadVerData */

/********************************************************************
 *
 * Uploads the result from an enrolment from FPC2010.
 *
 * @param *enrolResult - Memory area to store the enrolment data.
 *
 ********************************************************************/
void UploadEnrolResult(u_char *enrolResult)
{
    int current_byte;

*WorkRAMAddrPointer = 0;

for (current_byte = 0; current_byte < FPC2010_WORK_RAM_SIZE; current_byte++)
    {
        *enrolResult = *WorkRAMReadData;
        enrolResult++;
    }

} /* UploadEnrolResult */
```

```c
/******************************************************************
 *
 * Clears FPC2010 interrupt register.
 *
 ******************************************************************/
void ClearIRQReg(void)
{
  int irq_reg_tmp = 0;

irq_reg_tmp = *(volatile addr8) Interrupt;   //Read IRQ_REG in order to clear it
  irq_reg_tmp = *(volatile addr8) Interrupt;

} /* ClearIRQReg */

/******************************************************************
 *
 * Enables all the interrupts in FPC2010.
 *
 ******************************************************************/
void SetIRQMask(void)
{
  int irq_read;

*InterruptMask = 0xFE;        //Write IRQ mask FE = enable all
  irq_read      = *InterruptMask; //Read back IRQ mask in order to verify.

} /* SetIRQMask */

/******************************************************************
 *
```

```
* Perform a software reset for FPC2010.
*
*******************************************************************/
void SWReset(void)
{
  int irqmask = 0;

irqmask    = *(volatile addr8) InterruptMask;
  *SwReset = 1;
  irqmask    = *(volatile addr8) InterruptMask;

} /* SWReset */

/*******************************************************************
*
* Sets up parameters for the line line sensor.
*
* @param detect - Value for the line sensors DETECT register.
* @param drivc  - Value for the line sensors DRIVC register.
* @param adcref - Value for the line sensors ADCREF register.
*
*******************************************************************/
void SetUpLineSensorStartUp(int detect,int drivc,int adcref)
{

ResetLineSensor();
  SetUpLineSensor();
  SetUpLineSensorDETECT(detect);
  SetUpLineSensorDRIVC(drivc);
  SetUpLineSensorADCREF(adcref);

} /* SetUpLineSensorStartUp */
```

```c
/******************************************************************
 *
 * Sets up the parameters for the line sensor interface.
 *
 ******************************************************************/
void SetUpLineSensor(void)
{

*WaitCycles   = WAIT_REG_VALUE;
    *StartCycles  = START_CYCLE_VALUE;
    *CloseCycles  = CLOSE_CYCLE_VALUE;
    *ClockDevisor = CLOCK_DEVISOR;

} /* SetUpLineSensor */

/******************************************************************
 *
 * Reset the line sensor by writing to the Reset register.
 *
 ******************************************************************/
void ResetLineSensor(void)
{
  *SensorReset = 1;
//  uncal_delay(50); //Wait for reset to finish.
    delay(50); //Wait for reset to finish.
} /* ResetLineSensor */

/******************************************************************
 *
```

* Sets up the line sensor detect value.
*
* @param value - The value for the detect register.
*
**********************************************************/
void SetUpLineSensorDETECT(int value)
{

*SensorParameter_LSB = (unsigned char)value;
  *SensorCommand       = WRITE_DETECT;
  PollIRQReg(IRQ_SENSOR_COMPLETE);

} /* SetUpLineSensorDETECT */

/**********************************************************
*
* Sets up the line sensor drive_c value.
*
* @param value - The value for the driv_c register.
*
**********************************************************/
void SetUpLineSensorDRIVC(int value)
{

*SensorParameter_LSB = (unsigned char)value;
  *SensorCommand       = WRITE_DRIVE_C;
  PollIRQReg(IRQ_SENSOR_COMPLETE);

} /* SetUpLineSensorDRIVC */

/**********************************************************

```
 *
 * Sets up the line sensor adc_ref value.
 *
 * @param value - The value for the adc_ref register.
 *
 **********************************************************/
void SetUpLineSensorADCREF(int value)
{

*SensorParameter_LSB = (unsigned char)value;
  *SensorCommand      = WRITE_ADC_REF;
  PollRQReg(IRQ_SENSOR_COMPLETE);

} /* SetUpLineSensorADCREF */

/************************************************************
 *
 * Polls the interrupt flags for the FPC2010 and returns after the flag
 * has been set.
 *
 * @param irq - One or more interrupt flags to poll (interrupt mask).
 *
 **********************************************************/
void PollRQReg(unsigned char irq)
{
  unsigned char irq_reg_tmp;

irq_reg_tmp = (unsigned char)( irq & *(volatile addr8) Interrupt);

// Wait for IRQ flag to be set
  while (irq_reg_tmp == 0)
    {
```

```
        irq_reg_tmp = (unsigned char)( irq & *(volatile addr8) Interrupt);
    } irq_reg_tmp = *(volatile addr8) Interrupt;

} /* PollIRQReg */
```

FPC2010BIOMAIN.C

```
/*
 * Smart Card pin code generator with finger print access control
 * Control function for hardware FPC2010 with sensor FPC1030
 *
 * Copyright (C) 2001 DELTA IC Design, All Rights Reserved.
 *
 * $Author: Ibm $ :
 *
 * $Id: print.asm,v 1.12 2002/11/21 14:29:14 Ibm Exp $ :
 *
 */
#include "bpg.h"
include "typdefs.h"
#include "utility.h"

#include "fpc2010biomain.h"
#include "fpc2010interface.h"
#include "encapsulated_alg.h"
#include "fpc2010registers.h"

/*****************************************************************
 *
 * Turn on the MCK out clock. Starts the FPC2010.
 *
```

```c
*********************************************************/
void fpc2010On(void)
{
  *P9DR = *P9DR | FPC2010_RESET_MASK;    // De-assert reset pin
  *P6MR = *P6MR & ~FPC2010_CLOCK_MUX_MASK; // Set pin as clock output } /* fpc2010On */

/*********************************************************
 *
 * Turn off the MCK out clock. Stops the FPC2010.
 *
 *********************************************************/
void fpc2010Off(void)
{

*P6MR = *P6MR | FPC2010_CLOCK_MUX_MASK; // Set pin as io pin
  *P6DDR = *P6DDR & ~FPC2010_CLOCK_MASK;  // Set io pin as output
  *P6DR = *P6DR & ~FPC2010_CLOCK_MASK;    // Set data low

*P9DR = *P9DR & ~FPC2010_RESET_MASK;    // Assert reset pin
                   // This is done in order to set the LVDS IO in
                   // FPC2010 in power down mode. The RESET_PIN
                   // only resets FPC2010 if the clock is active.
} /* fpc2010Off */

/*********************************************************
 *
 * Initializes the FPC2010. Sets up the swipe sensor and
 * uploads a register file necessary for the device's execution.
 *
```

```
/*************************************************************/
void fpc2010Init(void)
{
unsigned char mem_cmd=0;

fpc2010On();

ClearIRQReg();
        SWReset();
        SetIRQMask();

SetUpLineSensorStartUp(DETECT_STARTUP_VAL,      DRIVC_STARTUP_VAL,
ADCREF_STARTUP_VAL);

ClearIRQReg();
        fpc2010LoadParameterFile(get_fpc2010_parameters(VERIFY_PARAMETERS));

// dummy write to FPC2010
        *FP_RAM_Cmd = mem_cmd;

fpc2010Off();

} /* fpc2010Init */

/*************************************************************
*
* Enrol a template into RAM.
*
* @param templateBuffer - Memory area for the downloaded template data.
*
* @return - TRUE:  If enrolment succeeded.
*           FALSE: Otherwise.
```

```c
 *
 *******************************************************************/
bool fpc2010Enrol(u_char *templateBuffer)
{
    unsigned int    swipeLength;
    signed char     pointOffset;
    u_char          enrolResult[FPC2010_WORK_RAM_SIZE];
    bool            success;

fpc2010On();

ClearIRQReg();

fpc2010LoadParameterFile(get_fpc2010_parameters(ENROL_PARAMETERS));

*ACHCmd = ACHCmd_ENROL;         // enrol command to FPC2010

PollIRQReg(IRQ_ACH_COMPLETE);   // wait until user has finished swiping finger

UploadEnrolResult(enrolResult); // get enrolment result from FPC2010 pointOffset = *AccPointOffset;                      // get x-translation
    swipeLength = (*TopLineLSB) + (*TopLineMSB) * 256;  // get swipe length // create template from result data
    success = Create_Template(enrolResult, templateBuffer, pointOffset, (short int)swipeLength);

fpc2010Off();

return success;

} /* fpc2010Enrol */
```

```c
/************************************************************************
 *
 * Verify a fingerprint against a template.
 *
 * @param templateBuffer - Pointer to the template memory.
 *
 * @return - TRUE: If verification succeeded.
 *           FALSE: Otherwise.
 *
 ************************************************************************/
bool fpc2010Verify(u_char *templateBuffer)
{
    unsigned int    swipeLength;
    signed char     pointOffset;
    u_char          verResult[FPC2010_VER_RESULT_RAM_SIZE];
    bool            success;

fpc2010On();

ClearIRQReg();

fpc2010LoadParameterFile(get_fpc2010_parameters(VERIFY_PARAMETERS));

DownloadVerData(templateBuffer);    // download verification data to FPC2010

*ACHCmd = ACHCmd_VERIFY;            // verify command to FPC2010

//          enableFpcCounter(); by sip
    PollIRQReg(IRQ_ACH_COMPLETE);       // wait until user has finished swiping finger
    //          disableFpcCounter(); by sip
```

```
            UploadVerResultRAMContent(verResult);        // get result data from FPC2010 pointOffset = (signed char) *AccPointOffset;    // get x-translation
            swipeLength = (*TopLineLSB) + (*TopLineMSB) * 256;    // get swipe length // match template against result data
            success = Match_Data(verResult, templateBuffer, pointOffset, (short int)swipeLength);

fpc2010Off();

return success;

} /* fpc2010Verify */

/***********************************************************
 *
 * Load register (parameter) file to FPC2010.
 *
 ***********************************************************/
void fpc2010LoadParameterFile(unsigned char *parameters)
{
            int current_byte;

*ParameterFilePointer = 0;

for (current_byte = 0; current_byte < PARAMETER_FILE_LENGTH; current_byte++)
            {
                        *ParameterFileWrite = *(parameters + current_byte);
            }

} /* fpc2010LoadParameterFile */
```

DISPLAY.C

/* Display utilities */ include "string.h"
include "7092.h"
include "bpg.h"

define DISP_DELAY 200

//define macroes
define ENABLE_DISP_COM *DISP_DR = *DISP_DR & ~DISP_NCSSEG_MASK; // Enable display com.
define DISABLE_DISP_COM *DISP_DR = *DISP_DR | DISP_NCSSEG_MASK; // Disable display com.

extern void delay(int count);
extern unsigned char disp_ram[8];

```
static const char ascii[] = {
    0x00, 0x00, 0x00, 0x00, 0x00, 0x00, 0x00, 0x00,   // 0 - 7
    0x00, 0x00, 0x00, 0x00, 0x00, 0x00, 0x00, 0x00,   // 8 - 15
    0x00, 0x00, 0x00, 0x00, 0x00, 0x00, 0x00, 0x00,   // 16 - 23
    0x00, 0x00, 0x00, 0x00, 0x00, 0x00, 0x00, 0x00,   // 24 - 31
    0x00, 0x00, 0x00, 0x00, 0x00, 0x00, 0x00, 0x00,   // 32 - 39
    0x00, 0x00, 0x00, 0x00, 0x00, 0x02, 0x00, 0x00,   // 40 - 47
    0x7d, 0x60, 0x3e, 0x7a, 0x63, 0x5b, 0x4f, 0x70,   // 48 - 55
    0x7f, 0x73, 0x00, 0x00, 0x00, 0x00, 0x00, 0x00,   // 56 - 63
    0x00, 0x77, 0x7f, 0x1d, 0x7d, 0x1f, 0x17, 0x5f,   // 64 - 71
    0x67, 0x60, 0x78, 0x00, 0x0d, 0x00, 0x00, 0x7d,   // 72 - 79
    0x37, 0x00, 0x00, 0x00, 0x00, 0x00, 0x00, 0x00,   // 80 - 87
    0x00, 0x00, 0x00, 0x00, 0x00, 0x00, 0x00, 0x00,   // 88 - 95
```

```
0x00, 0x00, 0x00, 0x0e, 0x6e, 0x3f, 0x00, 0x00,    // 96 - 103
0x00, 0x00, 0x68, 0x00, 0x00, 0x00, 0x00, 0x4e,    // 104 - 111
0x00, 0x00, 0x06, 0x00, 0x0f, 0x00, 0x00, 0x00,    // 112 - 119
0x00, 0x6b, 0x00, 0x00, 0x00, 0x00, 0x00, 0x00     // 120 - 127
};

/* reverse: reverse string s in place */
void reverse(char s[]) { char c;
    int i, j;

for (i = 0, j = strlen(s)-1; i < j; i++, j--) {
        c = s[i];
        s[i] = s[j];
        s[j] = c;
    }
}

/* itoa: convert n to characters in s */ void itoa(int n, char s[]) { int i, sign;

if ((sign = n) < 0) // Record the sign
        n = -n;

i = 0;
    do {            // Generate digits in recverse order
        s[i++] = (char)(n % 10 + '0'); // Get next digit
    } while ((n /= 10) > 0); // Delete it
```

```c
  if (sign < 0)
    s[i++] = '-';
  s[i] = '\0';
  reverse(s);
} void atodisp(char s[], unsigned char * data_ptr) { unsigned int i,j;

j = strlen(s);

for (i=0; i < j; i++) {
    data_ptr[i] = ascii[s[i]];
  }
} void Send_Disp(unsigned int data, unsigned int length) { unsigned int i;
  unsigned int bit;

for (i=0; i<length; i++) {
    bit = data & 0x01;          // mask out bit 0
    if (bit) {
      *DISP_DR = *DISP_DR | DISP_DATASEG_MASK;  // Setup data 1
    } else {
      *DISP_DR = *DISP_DR & ~DISP_DATASEG_MASK; // Setup data 0
    } delay(DISP_DELAY);
```

```c
    // write pulse
    *DISP_DR = *DISP_DR & ~DISP_NWRSEG_MASK; // Neg. write edge
    delay(DISP_DELAY);
    *DISP_DR = *DISP_DR | DISP_NWRSEG_MASK; // Pos. write edge
    data = data >> 1;
  }
} void Disp_Write_Ram(unsigned char * data_ptr) { unsigned int i;
  unsigned char data, temp;

ENABLE_DISP_COM; // Enable display com.

data = 0x5;
  Send_Disp(data, 3); // send 3 bit command data = 0x0;
  Send_Disp(data, 6); // send 6 bit address for (i=0; i<5; i++) {
    data = (unsigned char)data_ptr[i];
    Send_Disp((unsigned int)data, 8); // send 8 bit of display ram data
  }
  for (i=0; i<3; i++) {
    temp = (unsigned char)data_ptr[7-i];
    data = (unsigned char)(temp & 0xf0);
    data = (unsigned char)(data >> 4);
    temp = (unsigned char)(temp << 4);
    data = (unsigned char)(data | (temp & 0xf0));
    Send_Disp((unsigned int)data, 8); // send 8 bit of display ram data
```

}

DISABLE_DISP_COM; // Disable display com.
} void Disp_Send_Command(unsigned int data) {

ENABLE_DISP_COM;    // Enable display com
  Send_Disp(data, 12); // Send commando
  DISABLE_DISP_COM;   // Disable display com
} void write(char * s) { unsigned int i;

for (i = 0; i < DISP_RAM_SIZE; i++) { // Clear shadow display ram
    disp_ram[i] = 0x00;
  } atodisp(s, disp_ram);           // convert ascii to display symbols
  Disp_Write_Ram(disp_ram);       // write symbols to display ram
} void display_init() { disp_ram[0] = 0x00;
  disp_ram[1] = 0x00;
  disp_ram[2] = 0x00;
  disp_ram[3] = 0x00;
  disp_ram[4] = 0x00;
  disp_ram[5] = 0x00;

```
  disp_ram[6] = 0x00;
  disp_ram[7] = 0x00;

Disp_Send_Command(DISP_SYS_EN);
  Disp_Send_Command(DISP_BIAS_COM);
  Disp_Send_Command(DISP_LCD_ON);
} void display_test() { unsigned int j;
  unsigned long long * disp_ram_ptr;

disp_ram_ptr = (unsigned long long *)&disp_ram;

disp_ram[0] = 0x01;
  disp_ram[1] = 0x00;
  disp_ram[2] = 0x00;
  disp_ram[3] = 0x00;
  disp_ram[4] = 0x00;
  disp_ram[5] = 0x00;
  disp_ram[6] = 0x00;
  disp_ram[7] = 0x00;

j = 64;
  do {
    Disp_Write_Ram(disp_ram);

*disp_ram_ptr = *disp_ram_ptr << 1;

} while (j--);
}
```

VECTORS.S

;;; Copyright ARM Ltd 2001. All rights reserved.

```
    AREA Vect, CODE, READONLY
```

; These are example exception vectors and exception handlers
;
; Where there is ROM fixed at 0x0 (build_b), these are hard-coded at 0x0.
; Where ROM/RAM remapping occurs (build_c), these are copied from ROM to RAM.
; The copying is done automatically by the C library code inside __main.
;
; This version puts a branch to an Interrupt Handler (IRQ_Handler in int_handler.c)
; in its exception vector table.

;*****************
; Exception Vectors
;*****************

; Note: LDR PC instructions are used here, though branch (B) instructions
; could also be used, unless the ROM is at an address >32MB.

```
    ENTRY

LDR    PC, Reset_Addr
    LDR    PC, Undefined_Addr
    LDR    PC, SWI_Addr
    LDR    PC, Prefetch_Addr
    LDR    PC, Abort_Addr
    NOP                     ; Reserved vector
    LDR    PC, IRQ_Addr
    LDR    PC, FIQ_Addr
```

```
;       IMPORT  IRQ_Handler     ; In int_handler.c
        IMPORT  Reset_Handler   ; In init.s Reset_Addr      DCD     Reset_Handler
Undefined_Addr  DCD     Undefined_Handler
SWI_Addr        DCD     SWI_Handler
Prefetch_Addr   DCD     Prefetch_Handler
Abort_Addr      DCD     Abort_Handler
IRQ_Addr        DCD     IRQ_Handler
FIQ_Addr        DCD     FIQ_Handler ; ***********************
; Exception Handlers
; ***********************

; The following dummy handlers do not do anything useful in this example.
; They are set up here for completeness.

Undefined_Handler
        B       Undefined_Handler
SWI_Handler
        B       SWI_Handler
Prefetch_Handler
        B       Prefetch_Handler
Abort_Handler
        B       Abort_Handler
IRQ_Handler
        B       IRQ_Handler
FIQ_Handler
        B       FIQ_Handler
```

END

STACK.S

;;; Copyright ARM Ltd 2001. All rights reserved.

AREA   Stacks, DATA, NOINIT

EXPORT top_of_stacks

; Create dummy variable used to locate stacks in memory top_of_stacks   SPACE   1

END

INIT.S

;;; Copyright ARM Ltd 2001. All rights reserved.
;
; This module performs ROM/RAM remapping (if required), initializes stack
; pointers and interrupts for each mode, and finally branches to __main in
; the C library (which eventually calls main()).
;
; On reset, the ARM core starts up in Supervisor (SVC) mode, in ARM state,
; with IRQ and FIQ disabled.

AREA   Init, CODE, READONLY

; --- Set up if ROM/RAM remapping required

```
;        GBLL ROM_RAM_REMAP
;ROM_RAM_REMAP   SETL {TRUE} ; change to {FALSE} if remapping not required ; --- ensure no functions that use semihosting SWIs are linked in from the C library ;;       IMPORT __use_no_semihosting_swi ; --- Standard definitions of mode bits and interrupt (I & F) flags in PSRs Mode_USR    EQU     0x10
Mode_FIQ    EQU     0x11
Mode_IRQ    EQU     0x12
Mode_SVC    EQU     0x13
Mode_ABT    EQU     0x17
Mode_UND    EQU     0x1B
Mode_SYS    EQU     0x1F ; available on ARM Arch 4 and later I_Bit       EQU     0x80 ; when I bit is set, IRQ is disabled
F_Bit       EQU     0x40 ; when F bit is set, FIQ is disabled ; --- System memory locations MEMCR           EQU     0x09001010      ; Address of Core Module Control Register (write only)
MEMSR           EQU     0x0900100c      ; Address of Core Module Control Register (read only)
Remap_bit  EQU  0x01           ; Bit 0 is remap bit of CM_ctl BCR1       EQU  0x09000104     ; Address of Bus Controller register for CS1
MEMWIDTH_bit   EQU    0x100    ; Bit 8 is external bus width
WAITSTATES_bit EQU    0x2      ; Number of wait states is WAITSTATES_bit + 1
```

; --- Amount of memory (in bytes) allocated for stacks

;Len_FIQ_Stack    EQU    8192
;Len_IRQ_Stack    EQU    8192
;Len_ABT_Stack    EQU    8192
;Len_UND_Stack    EQU    8192
;Len_SVC_Stack    EQU    8192
;Len_USR_Stack    EQU    8192

Len_FIQ_Stack    EQU    0
Len_IRQ_Stack    EQU    256
Len_ABT_Stack    EQU    0
Len_UND_Stack    EQU    0
Len_SVC_Stack    EQU    256
Len_USR_Stack    EQU    256
;
; Add lengths >0 for FIQ_Stack, ABT_Stack, UND_Stack if you need them.
; Offsets will be loaded as immediate values.
; Offsets must be 8 byte aligned.

Offset_FIQ_Stack        EQU    0
Offset_IRQ_Stack        EQU    Offset_FIQ_Stack + Len_FIQ_Stack
Offset_ABT_Stack        EQU    Offset_IRQ_Stack + Len_IRQ_Stack
Offset_UND_Stack        EQU    Offset_ABT_Stack + Len_ABT_Stack
Offset_SVC_Stack        EQU    Offset_UND_Stack + Len_UND_Stack
Offset_USR_Stack        EQU    Offset_SVC_Stack + Len_SVC_Stack

ENTRY

; --- Perform ROM/RAM remapping, if required
    IF :DEF: ROM_RAM_REMAP

; On reset, an aliased copy of ROM is at 0x0.
; Continue execution from 'real' ROM rather than aliased copy
        LDR    pc, =Instruct_2

Instruct_2

; Remap by setting Remap bit of the MEMCR/MEMSR register
;       LDR    r1, =MEMSR
;       LDR    r0, [r1]
;       ORR    r0, r0, #Remap_bit
;       LDR    r1, =MEMCR
;       STR    r0, [r1]

; RAM is now at 0x0.
; The exception vectors (in vectors.s) must be copied from ROM to the RAM
; The copying is done later by the C library code inside __main ; Set external bus width for CS1 to 8-bit
        LDR    r1, =BCR1
        LDR    r0, [r1]
        ORR    r0, r0, #MEMWIDTH_bit
        ORR    r0, r0, #WAITSTATES_bit
        STR    r0, [r1]

ENDIF

EXPORT Reset_Handler

Reset_Handler

```
; --- Initialize stack pointer registers

; Enter each mode in turn and set up the stack pointer

IMPORT  top_of_stacks   ; defined in stack.s and located by scatter file
        LDR     r0, =top_of_stacks ;       MSR     CPSR_c, #Mode_FIQ:OR:I_Bit:OR:F_Bit ; No interrupts
;       SUB     sp, r0, #Offset_FIQ_Stack MSR     CPSR_c, #Mode_IRQ:OR:I_Bit:OR:F_Bit ; No interrupts
        SUB     sp, r0, #Offset_IRQ_Stack ;       MSR     CPSR_c, #Mode_ABT:OR:I_Bit:OR:F_Bit ; No interrupts
;       SUB     sp, r0, #Offset_ABT_Stack ;       MSR     CPSR_c, #Mode_UND:OR:I_Bit:OR:F_Bit ; No interrupts
;       SUB     sp, r0, #Offset_UND_Stack MSR     CPSR_c, #Mode_SVC:OR:I_Bit:OR:F_Bit ; No interrupts
        SUB     sp, r0, #Offset_SVC_Stack ; --- Initialize critical IO devices
        ; ...

; --- Now change to User mode and set up User mode stack, if needed
        MSR     CPSR_c, #Mode_USR:OR:F_Bit    ; IRQs now enabled
        SUB     sp, r0, #Offset_USR_Stack IMPORT  __main ; --- Now enter the C code
        B       __main   ; note use B not BL, because an application will never return this way
```

END

HEAP.S

;;; Copyright ARM Ltd 2001. All rights reserved.

AREA   Heap, DATA, NOINIT

EXPORT bottom_of_heap

; Create dummy variable used to locate bottom of heap
bottom_of_heap   SPACE  1

END

The invention claimed is:

1. A system for identifying a specific individual using a biometric characteristic of the specific individual, comprising:
- a computer system comprising a first database containing a dynamic binary code conversion algorithm, and a second database including a sequence of binary codes generated sequentially by means of the dynamic binary code conversion algorithm;
- a housing containing a biometric sensor located so as to be receptive to a defined biometric characteristic and operable to generate a sensor code in response to the detection of the defined biometric characteristic;
- a controller device in the housing and operably connected to the biometric sensor, the controller device including a memory configured for storing (i) a first code representing the defined biometric characteristic of the specific individual and (ii) the dynamic binary code conversion algorithm;
- a first communication device in the housing and operably controlled by the controller device so as to establish communication between the controller device and the computer system;
- a second communication device operably associated with the computer system so as to establish communication between the computer system and the controller device; and
- a visual display device controlled by the controller device;
- wherein the controller device, upon receiving the sensor code from the biometric sensor, performs a comparison between the sensor code and the first code stored in the memory, and, if the comparison verifies the identity between the sensor code and the first code, generates a first pin code by means of the dynamic binary code conversion algorithm and outputs the first pin code by means of the first communication device to the computer system;
- wherein the dynamic binary code conversion algorithm generates the first pin code based on at least a random number generated via the controller and predetermined personal identification information;
- wherein the computer system generates, upon receiving the first pin code by means of the second communication device, a second binary code by means of the dynamic binary code conversion algorithm and verifies the identity of the specific individual if the second binary code matches the first pin code;
- wherein, if the second binary code does not match the first pin code, the computer system compares the first pin code with the sequence of binary codes contained in the second database so as to verify the identity of the specific individual if the first pin code matches one of the binary codes in the sequence of binary codes; and
- wherein the visual display device is controlled by the controller device so as to display the first pin code as an alphanumeric code after verification of an identity between the sensor code and the first code.

2. The system of claim 1, wherein said biometric sensor is selected from the group consisting of at least one of an iris scanner, a blood scanner, a DNA scanner, a voice identification device, a face recognition scanner, an array scanner configured for scanning a palm, an array scanner configured for scanning a finger, and a finger print scanner.

3. The system of claim 1, wherein the housing has the configuration and the dimensions of a credit card conforming to the ISO standard (International Organization of Standardization), and wherein the sensor code is an alphanumeric code.

4. The system of claim 1, further comprising encryption and decryption means controlled by the controller device for encrypting and decrypting communications between the controller device and the computer system.

5. The system of claim 1, wherein the first and second communication devices are selected from the group consisting of a parallel communication interface, a serial communication interface, an SPI, an I2C, a USB, a wireless communication interface, an infra red, and an RF communication device.

* * * * *